United States Patent
Ko et al.

(10) Patent No.: US 9,065,620 B2
(45) Date of Patent: *Jun. 23, 2015

(54) METHOD AND DEVICE FOR DOWNLINK CONFIRMATION RESPONSE DATA TRANSMISSION RESOURCE ALLOCATION IN A WIRELESS COMMUNICATION SYSTEM

(75) Inventors: Hyunsoo Ko, Anyang-si (KR); Moonil Lee, Anyang-si (KR); Seunghee Han, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 224 days.

This patent is subject to a terminal disclaimer.

(21) Appl. No.: 13/696,013

(22) PCT Filed: May 4, 2011

(86) PCT No.: PCT/KR2011/003351
§ 371 (c)(1),
(2), (4) Date: Nov. 2, 2012

(87) PCT Pub. No.: WO2011/139100
PCT Pub. Date: Nov. 10, 2011

(65) Prior Publication Data
US 2013/0051371 A1      Feb. 28, 2013

Related U.S. Application Data

(60) Provisional application No. 61/330,894, filed on May 4, 2010, provisional application No. 61/357,501, filed on Jun. 22, 2010.

(51) Int. Cl.
*H04W 72/04* (2009.01)
*H04L 5/00* (2006.01)
(Continued)

(52) U.S. Cl.
CPC ............ *H04L 5/0055* (2013.01); *H04L 1/1861* (2013.01); *H04L 5/0053* (2013.01); *H04B 7/0413* (2013.01); *H04L 1/1812* (2013.01)

(58) Field of Classification Search
CPC ... H04L 1/1861; H04L 1/1812; H04L 5/0053; H04L 5/0055; H04B 7/0639; H04B 7/0413; H04W 72/042
USPC .................................. 370/310, 328, 329, 335
See application file for complete search history.

(56) References Cited

U.S. PATENT DOCUMENTS 8,218,663 B2 * 7/2012 Muharemovic et al. ...... 375/260
8,289,935 B2 * 10/2012 Frederiksen et al. ......... 370/337
(Continued)

FOREIGN PATENT DOCUMENTS

KR  10-2009-0017450  2/2009
KR  10-2009-0122989  12/2009

*Primary Examiner* — Phuc Tran
*Assistant Examiner* — Robert Lopata
(74) *Attorney, Agent, or Firm* — McKenna Long & Aldridge LLP

(57) ABSTRACT

The present invention relates to a method for transmitting downlink hybrid automatic repeat request (HARQ) confirmation response information in a wireless communication system comprises the steps of: receiving, on an uplink data channel, a plurality of codewords from an uplink transmitter; generating items of confirmation response information for each of the plurality of codewords, in accordance with the results of decoding of the plurality of codewords; and transmitting each of the generated items of confirmation response information to the uplink transmitter on each of a plurality of physical HARQ indicator channel (PHICH) resources; wherein each of the plurality of PHICH resources can be allocated for the transmission of confirmation response information for each of the plurality of codewords, based on parameters having different values for each of the codewords.

8 Claims, 12 Drawing Sheets

(51) Int. Cl.
*H04L 1/18* (2006.01)
*H04B 7/04* (2006.01)

(56) References Cited

U.S. PATENT DOCUMENTS

| | | | |
|---|---|---|---|
| 8,320,337 B2* | 11/2012 | Noh et al. | 370/335 |
| 8,503,425 B2* | 8/2013 | Chung et al. | 370/349 |
| 8,516,327 B2* | 8/2013 | Kim et al. | 714/749 |
| 8,531,962 B2* | 9/2013 | Chen et al. | 370/236 |
| 8,537,788 B2* | 9/2013 | Lee et al. | 370/335 |
| 8,625,509 B2* | 1/2014 | Ahn et al. | 370/329 |
| 2009/0241004 A1 | 9/2009 | Ahn et al. | |
| 2010/0034312 A1* | 2/2010 | Muharemovic et al. | 375/267 |
| 2010/0172308 A1* | 7/2010 | Nam et al. | 370/329 |
| 2011/0026420 A1* | 2/2011 | Zhang et al. | 370/252 |
| 2011/0026622 A1* | 2/2011 | Luo et al. | 375/260 |
| 2011/0206014 A1* | 8/2011 | Lee et al. | 370/335 |
| 2012/0093094 A1* | 4/2012 | Zhang et al. | 370/329 |
| 2012/0320839 A1* | 12/2012 | Noh et al. | 370/329 |

\* cited by examiner

METHOD AND DEVICE FOR DOWNLINK CONFIRMATION RESPONSE DATA TRANSMISSION RESOURCE ALLOCATION IN A WIRELESS COMMUNICATION SYSTEM

This Application is a 35 U.S.C. §371 National Stage Entry of International Application No. PCT/KR2011/003351, filed May 4, 2011 and claims the benefit of U.S. Provisional Application Nos. 61/330,894, filed May 4, 2010 and 61/357,501, filed Jun. 22, 2010, all of which are incorporated by reference in their entirety herein.

TECHNICAL FIELD

The present invention relates to a wireless communication system, and more particularly to a method and device for allocating downlink confirmation response data transmission resources in a wireless communication system.

BACKGROUND ART

MIMO is abbreviated from Multiple-Input Multiple-Output, and means a method for improving efficiency in data transmission and reception by using multiple transmitting antennas and multiple receiving antennas instead of a single transmitting antenna and a single receiving antenna. Namely, the MIMO technology is to increase capacity or improve throughput by using multiple antennas in a transmitter or receiver of a wireless communication system. Herein, the MIMO technology may be referred to as multi-antenna technology.

Examples of a MIMO scheme include a Single CodeWord (SCW) scheme and a Multiple CodeWord (MCW) scheme, wherein the SCW scheme is intended to transmit N number of data streams at the same time by using a single channel encoding block, and the MCW scheme is intended to transmit N number of data streams by using M (M is always smaller than or equal to N) number of channel encoding blocks. In this case, each channel encoding block generates independent codewords, each of which is designed to enable independent error detection.

In a system that transmits multiple codewords, a receiver is required to notify a transmitter of success/failure in detection (or decoding) of each codeword. To this end, the receiver may transmit a hybrid automatic repeat request (HARQ) acknowledgement/non-acknowledgement (ACK/NACK) signal for each codeword to the transmitter.

In case of uplink data transmission through the existing single antenna, single codeword transmission may be supported. The receiver (for example, base station) that receives a single codeword from the transmitter (for example, user equipment) may transmit the HARQ ACK/NACK signal to the transmitter through a physical hybrid automatic repeat request indicator channel (HARQ PHICH).

DISCLOSURE

Technical Problem

Since HARQ operation for uplink single codeword transmission is only defined in the 3GPP LTE system according to the related art, HARQ operation for uplink multi-codeword transmission and retransmission of a user equipment having multiple antennas and a method for configuring PHICH resources for supporting the HARQ operation should newly be defined.

Accordingly, an object of the present invention devised to solve the conventional problem is to provide a method for PHICH resource allocation, in which HARQ ACK/NACK information for uplink MIMO transmission that supports extended antenna configuration is transmitted.

Another object of the present invention is to provide a method for allocating multiple PHICH resources efficiently while avoiding PHICH resource collision.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transmitting downlink hybrid automatic repeat request (HARQ) ACK/NACK information in a wireless communication system comprises the steps of receiving, on an uplink data channel, a plurality of codewords from an uplink transmission entity; generating ACK/NACK information for each of the plurality of codewords, in accordance with the results of decoding of the plurality of codewords; and transmitting each of the generated ACK/NACK information to the uplink transmission entity on each of a plurality of physical HARQ indicator channel (PHICH) resources, wherein each of the plurality of PHICH resources is allocated for transmission of the ACK/NACK information for each of the plurality of codewords, based on a parameter having different values for each of the codewords.

To solve the aforementioned technical problems, according to another embodiment of the present invention, a method for receiving downlink hybrid automatic repeat request (HARQ) ACK/NACK information in a wireless communication system comprises the steps of transmitting, on an uplink data channel, a plurality of codewords to an uplink reception entity; and receiving each of ACK/NACK information for each of the plurality of codewords on each of a plurality of physical HARQ indicator channel (PHICH) resources from the uplink reception entity, the ACK/NACK information being generated in accordance with the results of decoding of the plurality of codewords, wherein each of the plurality of PHICH resources is allocated for transmission of the ACK/NACK information for each of the plurality of codewords, based on a parameter having different values for each of the codewords.

To solve the aforementioned technical problems, according to still another embodiment of the present invention, a base station for transmitting downlink hybrid automatic repeat request (HARQ) ACK/NACK information in a wireless communication system comprises a transmission module transmitting a downlink signal to a user equipment; a reception module receiving an uplink signal from the user equipment; and a processor controlling the base station, which includes the reception module and the transmission module, wherein the processor receives, on an uplink data channel, a plurality of codewords from the user equipment, generates ACK/NACK information for each of the plurality of codewords, in accordance with the results of decoding of the plurality of codewords, and transmits each of the generated ACK/NACK information on each of a plurality of physical HARQ indicator channel (PHICH) resources to the user equipment through the transmission module, and each of the plurality of PHICH resources is allocated for transmission of the ACK/NACK information for each of the plurality of codewords, based on a parameter having different values for each of the codewords.

To solve the aforementioned technical problems, according to further still another embodiment of the present invention, a user equipment for receiving downlink hybrid automatic repeat request (HARQ) ACK/NACK information in a wireless communication system comprises a transmission module transmitting an uplink signal to a base station; a reception module receiving a downlink signal from the base station; and a processor controlling the user equipment, which includes the reception module and the transmission module, wherein the processor transmits, on an uplink data channel, a plurality of codewords to the base station, and receives each of ACK/NACK information for each of the plurality of codewords on each of a plurality of physical HARQ indicator channel (PHICH) resources from the base station through the reception module, the ACK/NACK information being generated in accordance with the results of decoding of the plurality of codewords, and each of the plurality of PHICH resources is allocated for transmission of the ACK/NACK information for each of the plurality of codewords, based on a parameter having different values for each of the codewords.

The following matters may commonly be applied to the aforementioned embodiments of the present invention.

The plurality of PHICH resources may include a PHICH group index and a PHICH sequence index, and one or more of the PHICH group index and the PHICH sequence index may be determined based on the parameter.

The PHICH group index may include the lowest physical resource block (PRB) index of uplink allocation and a cyclic shift index for an uplink demodulation reference signal (DMRS), and one or more of the lowest PRB index and the cyclic shift index may be determined differently based on the parameter.

The PHICH sequence index may include the lowest physical resource block (PRB) index of uplink allocation and a cyclic shift index for an uplink demodulation reference signal (DMRS), and one or more of the lowest PRB index and the cyclic shift index may be determined differently based on the parameter.

The parameter may be defined as one of an index value of each of the plurality of codewords, a modulation and coding scheme (MCS) level of each of the plurality of codewords, an offset value based on index of each of the plurality of codewords, and an offset value based on the number of resource blocks set for uplink transmission.

The parameter may have different values per carrier.

The parameter may be set to different values as much as a spreading factor size used for PHICH modulation between one codeword and another codeword.

The aforementioned embodiments and the following detailed description of the present invention are only exemplary, and are for additional description of the present invention cited in claims.

Advantageous Effects

According to the present invention, a method for PHICH resource allocation may be provided, in which HARQ ACK/NACK information for uplink MIMO transmission that supports extended antenna configuration is transmitted. Also, a method for allocating multiple PHICH resources efficiently while avoiding PHICH resource collision may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
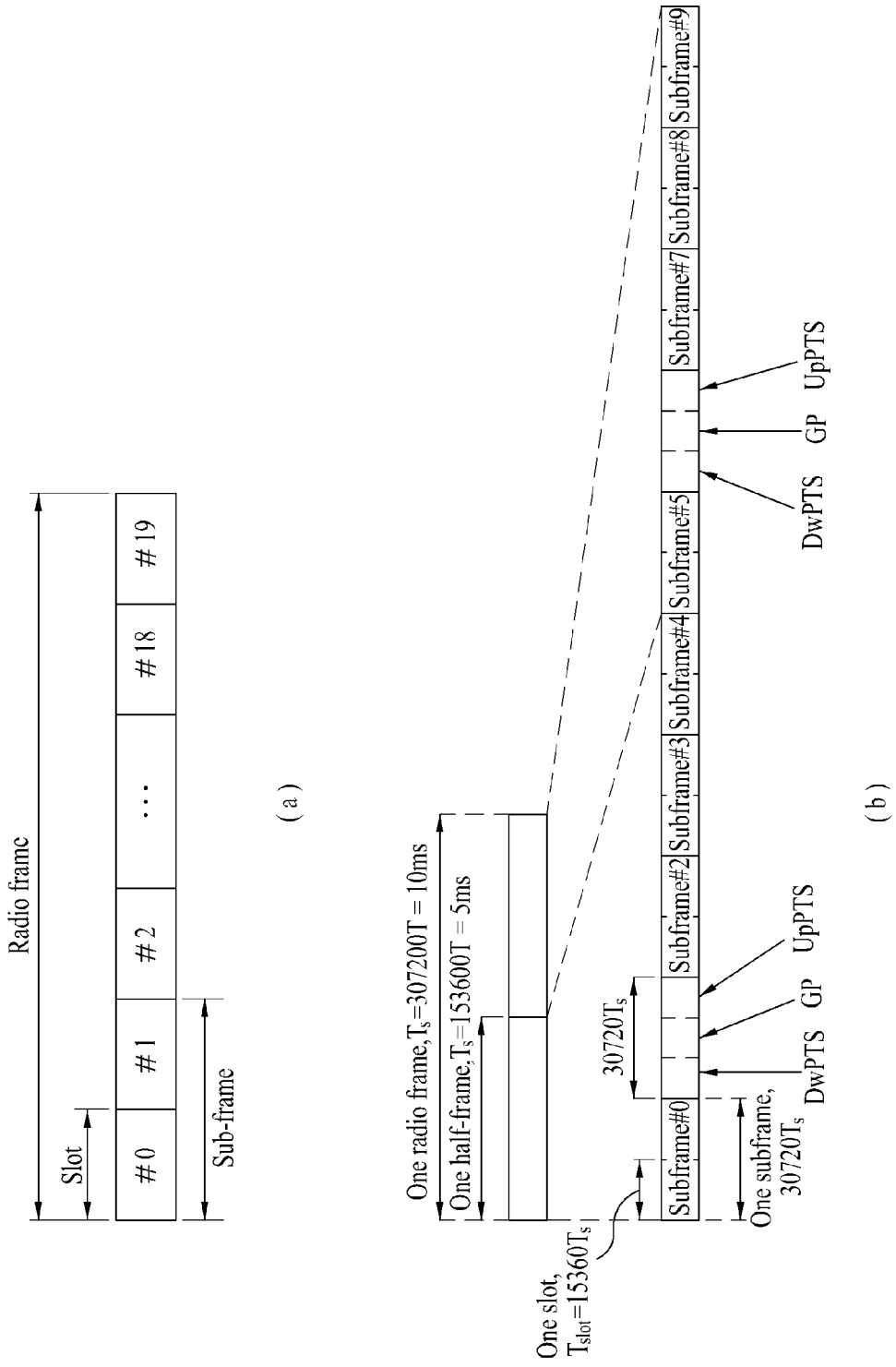
FIG. 1 is a diagram illustrating a structure of a downlink radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. The base station (BS) may be replaced with terms such as a fixed station, Node B, eNode B (eNB), and an access point (AP). Also, in this specification, the term, base station may be used as a concept that includes a cell or sector. Meanwhile, a relay may be replaced with a relay node (RN) or a relay station (RS). A terminal may be replaced with terms such as a user equipment (UE), a mobile station (MS), a mobile subscriber station (MSS), or a subscriber station (SS). In this specification, an uplink transmission entity may mean a user equipment or a relay node, and an uplink reception entity may mean a base station or a relay node. Similarly, a downlink transmission entity may mean a base station or a relay node, and a downlink reception entity may mean a user equipment or a relay node. In other words, uplink transmission may mean transmission from a user equipment to a base station, transmission from a user equipment to a relay node, or transmission from a relay node to a base station. Similarly, downlink transmission may mean transmission from a base station to a user equipment, transmission from a base station to a relay node, or transmission from a relay node to a user equipment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE and LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

A structure of a downlink radio frame will be described with reference to FIG. 1.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since OFDMA is used on a downlink in the 3GPP LTE system, the OFDM symbols represent one symbol interval. The OFDM symbols may be referred to as SC-FDMA symbols or symbol interval. A resource block is a resource allocation unit and may include a plurality of continuous subcarriers at one slot.

The number of OFDM symbols included in one slot may be varied depending on configuration of cyclic prefix (CP). Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the subframes includes two slots. The DwPTS is used for initial cell search at a user equipment, synchronization or channel estimation. The UpPTS is used for channel estimation at a base station and uplink transmission synchronization of the user equipment. The guard period is to remove interference occurring in the uplink due to multi-path delay of a downlink signal between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
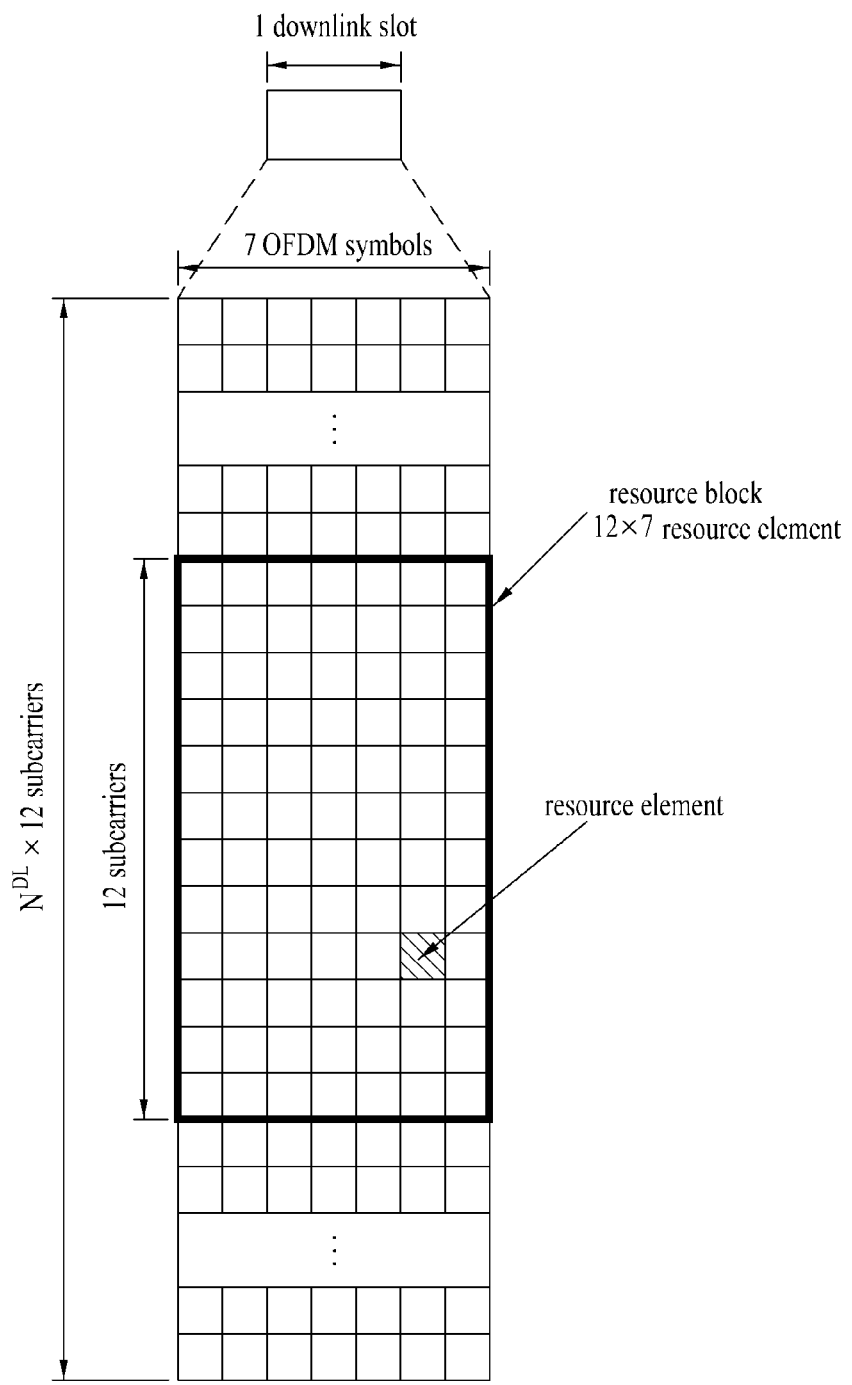
FIG. 2 is a diagram illustrating an example of a resource grid for one downlink slot.

FIG. 2 is a diagram illustrating an example of a resource grid at a downlink slot. In this case, OFDM symbols are configured by a normal CP. Referring to FIG. 2, a downlink slot includes a plurality of OFDM symbols in a time domain and a plurality of resource blocks in a frequency domain. In this case, one downlink slot includes, but not limited to, seven OFDM symbols, and one resource block (RB) includes, but not limited to, twelve subcarriers. Each element on the resource grid will be referred to as a resource element (RE). For example, resource element a(k, l) becomes the resource element located at the kth subcarrier and the first OFDM symbol. In case of the normal CP, one resource block includes 12×7 resource elements (in case of the extended CP, one resource block includes 12×7 resource elements). Since an interval between the respective subcarriers is 15 kHz, one resource block includes 180 kHz, approximately, in the frequency domain. $N^{DL}$ is the number of resource blocks included in the downlink slot. The value of $N^{DL}$ may be determined depending on a downlink transmission bandwidth set by scheduling of the base station.

Figure 3:
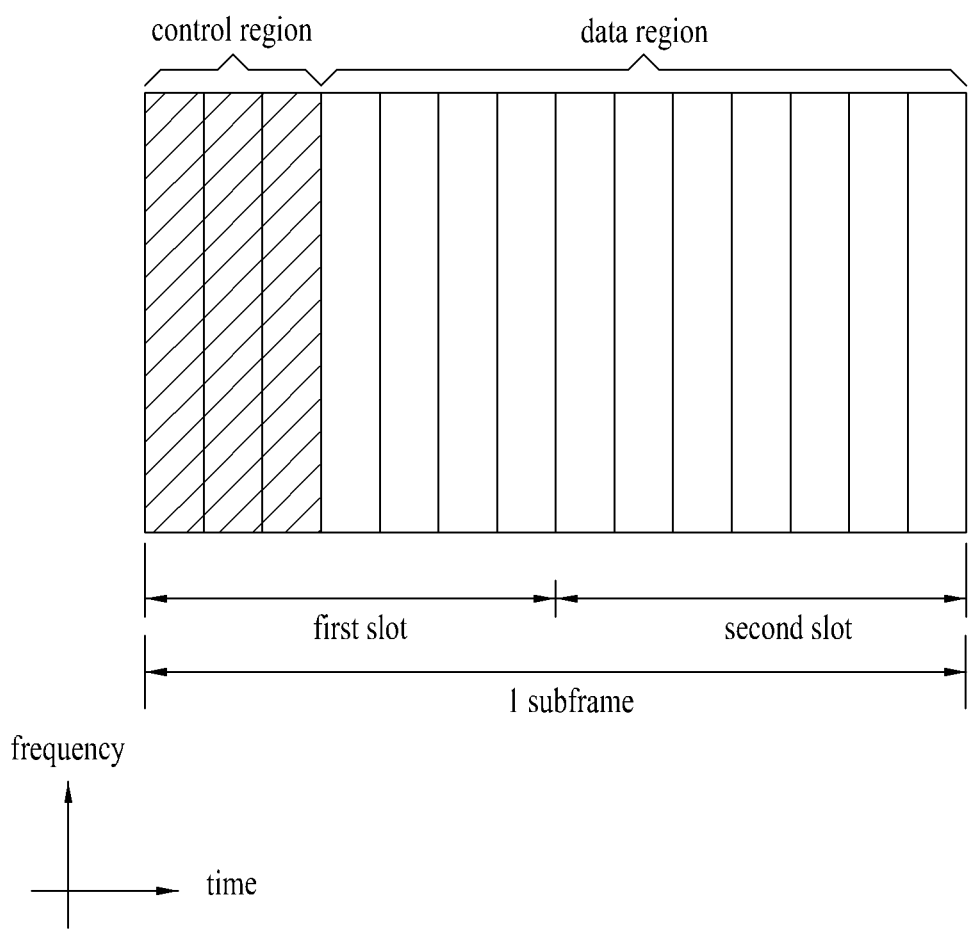
FIG. 3 is a diagram illustrating a structure of a downlink subframe.

FIG. 3 is a diagram illustrating a structure of a downlink subframe. Maximum three OFDM symbols located at the front of the first slot within one subframe correspond to a control region to which a control channel is allocated. The other OFDM symbols correspond to a data region to which a physical downlink shared channel (PDSCH) is allocated. A basic unit of transmission becomes one subframe. In other words, a PDCCH and a PDSCH are allocated to two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK signal in response to uplink transmission. The control information transmitted through the PDCCH will be referred to as downlink control information (DCI). The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCE. The base station determines a PDCCH format depending on the DCI transmitted to the user equipment, and attaches cyclic redundancy check (CRC) to the control information. The CRC is masked with an identifier (for example, radio network temporary identifier (RNTI)) depending on owner or usage of the PDCCH. If the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). In order to represent a random access response which is the response to transmission of a random access preamble of the user equipment, the CRC may be masked with a random access RNTI (RA-RNTI).

Figure 4:
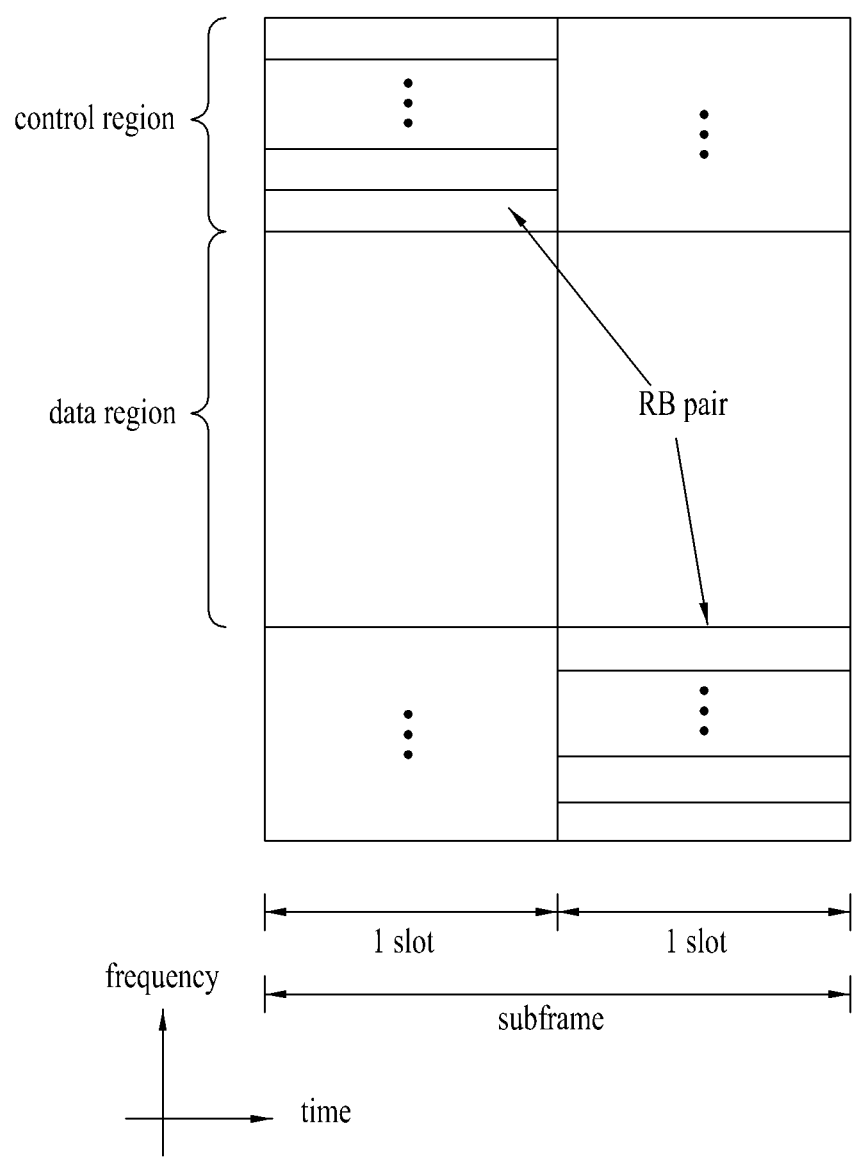
FIG. 4 is a diagram illustrating a structure of an uplink subframe.

FIG. 4 is a diagram illustrating a structure of an uplink subframe. The uplink subframe may be divided into a control region and a data region in a frequency domain. A physical uplink control channel (PUCCH) which includes uplink control information is allocated to the control region. A physical uplink shared channel (PUSCH) which includes user data is allocated to the data region. In order to maintain single carrier properties, one user equipment does not transmit the PUCCH and the PUSCH at the same time. The PUCCH for one user equipment is allocated to a pair of RBs at the subframe. Resource blocks belonging to the pair of RBs occupy different subcarriers for two slots. This will be referred to frequency hopping of a pair of RBs allocated to the PUCCH at the boundary of the slots.

Configuration of Downlink Control Channel

First three OFDM symbols of each subframe may basically be used as a region where a downlink control channel is transmitted, and first to three OFDM symbols may be used depending on overhead of the downlink control channel. A PCFICH may be used to control the number of OFDM symbols for the downlink control channel per subframe. A PHICH may be used to provide ACK/NACK for uplink transmission through a downlink. Also, a PDCCH may be used to transmit control information for downlink data transmission or uplink data transmission.

Figure 5:
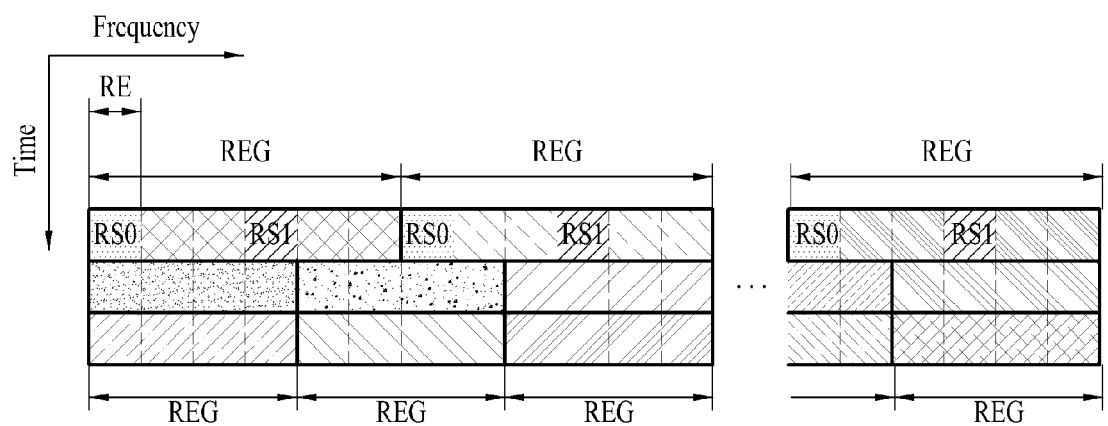
FIG. 5 and FIG. 6 are diagrams illustrating a resource element group (REG) which is an allocation unit of downlink control channels.
Figure 6:
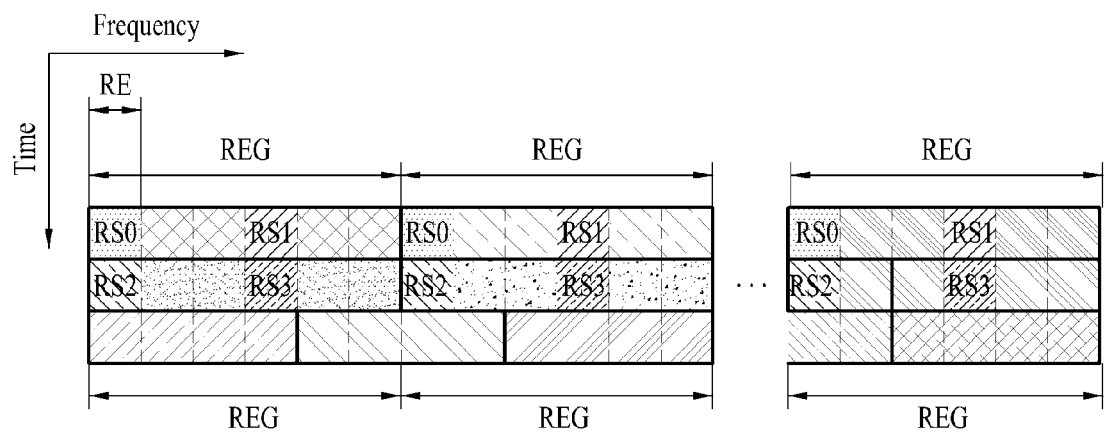

FIG. 5 and FIG. 6 illustrate that downlink control channels are allocated from a control region of each subframe in a unit of a resource element group (REG). FIG. 5 relates to a system having one or more transmitting antennas, and FIG. 6 relates to a system having four transmitting antennas. As shown in FIG. 5 and FIG. 6, the REG which is a basic resource unit for allocation of the control channel includes four concatenated resource elements (REs) in the frequency domain except for a resource element to which a reference signal is allocate. A specific number of REGs may be used for transmission of the downlink control channel depending on overhead of the downlink control channel.

PCFICH (Physical Control Format Indicator Channel)

In order to provide each of all the subframes with resource allocation information of a corresponding subframe, the PDCCH may be transmitted between OFDM symbol indexes 0 and 2. The OFDM symbol index 0, the OFDM symbol indexes 0 and 1, or the OFDM symbol indexes 0 to 2 may be used depending on overhead of the control channel. In this way, the number of OFDM symbols used by the control channel may be varied per subframe. This information may be provided through the PCFICH. Accordingly, the PCFICH should be transmitted from each of all the subframes.

Three types of information may be provided through the PCFICH. The following Table 1 illustrates a control format indicator (CFI) of the PCFICH. CFI=1 represents that the PDCCH is transmitted from the OFDM symbol index 0, CFI=2 represents that the PDCCH is transmitted from the OFDM symbol indexes 0 and 1, and CFI=3 represents that the PDCCH is transmitted from the OFDM symbol indexes 0 to 2.

TABLE 1

| CFI | CFI codeword <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The information transmitted through the PCFICH may be defined differently depending on system bandwidth. For example, if the system bandwidth is smaller than a specific threshold value, CFI=1, 2, 3 may respectively represent that 2, 3, and 4 OFDM symbols are respectively used for the PDCCH.

Figure 7:
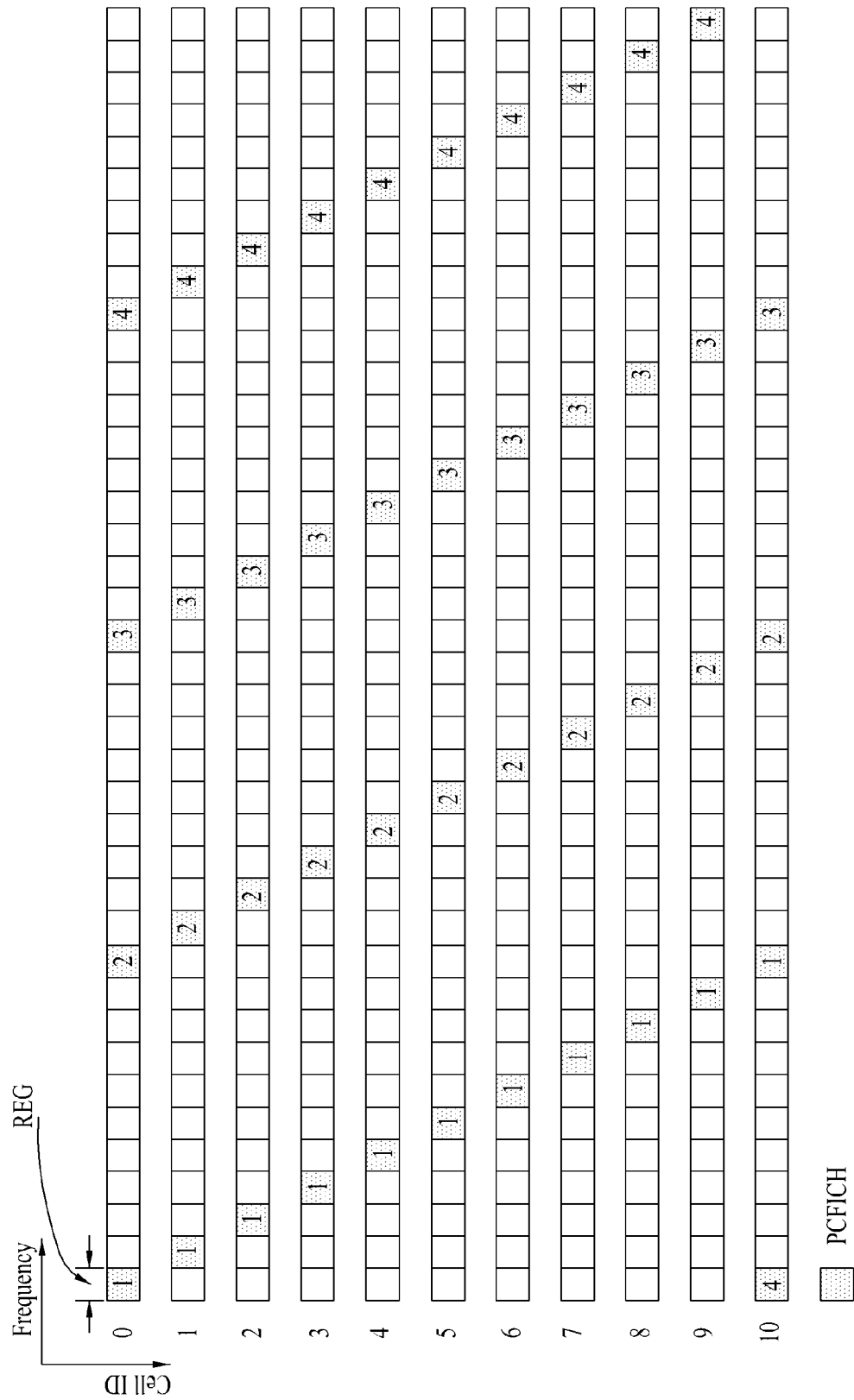
FIG. 7 is a diagram illustrating a transmission scheme of a physical control format indicator channel (PCFICH)

FIG. 7 is a diagram illustrating a transmission scheme of a physical control format indicator channel (PCFICH). The REG shown in FIG. 7 includes four subcarriers which are data subcarriers except for reference signal (RS). Generally, a transmit diversity scheme may be applied to the REG. Also, the location of the REG may be frequency-shifted per cell (that is, depending on cell identifier) so as not to cause inter-cell interference. Additionally, the PCFICH is always transmitted from the first OFDM symbol (OFDM symbol index 0) of the subframe. Accordingly, a receiver may identify the number of OFDM symbols to which the PDCCH is transmitted by checking information of the PCFICH when receiving the subframe and receive control information transmitted through the PDCCH.

PHICH (Physical Hybrid-ARQ Indicator Channel)

Figure 8:
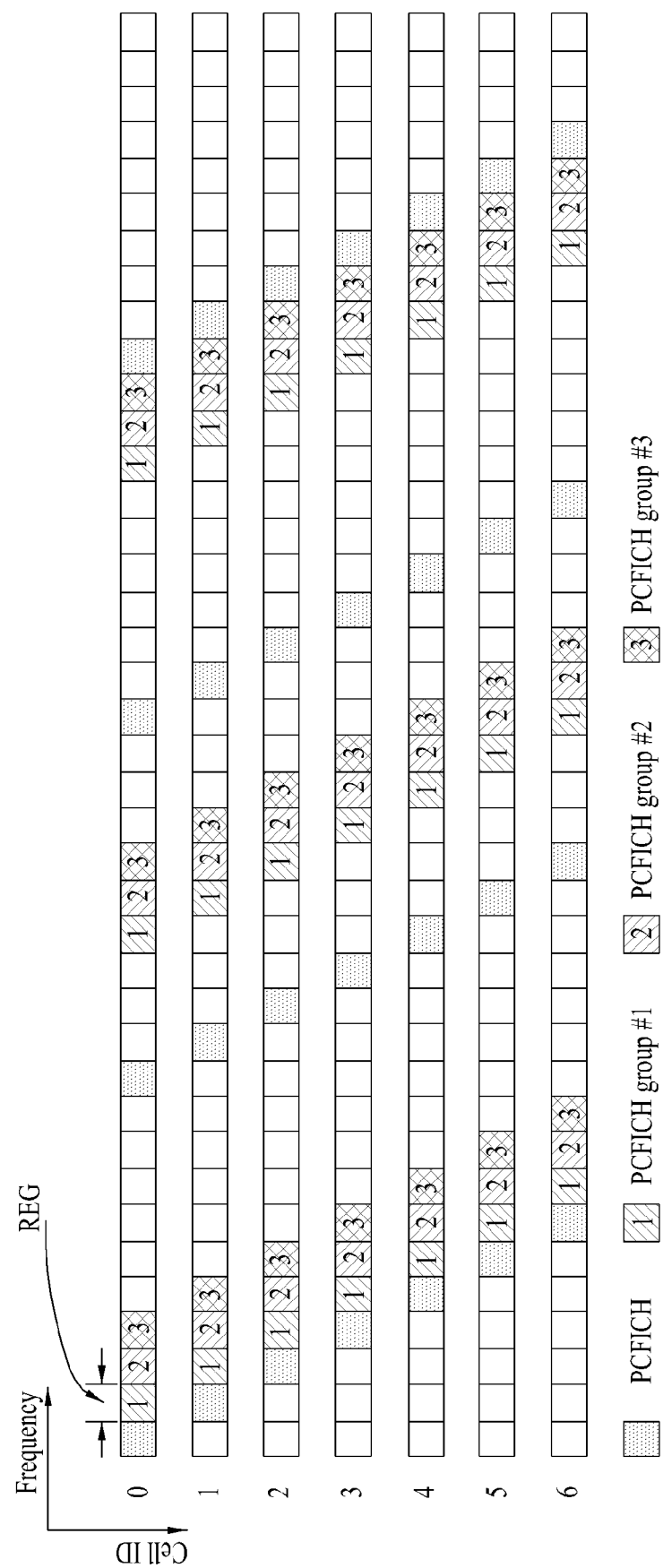
FIG. 8 is a diagram illustrating locations of a PCFICH and a physical HARQ indicator channel (PHICH)

FIG. 8 is a diagram illustrating locations of a PCFICH and a physical HARQ indicator channel (PHICH). ACK/NACK information for uplink data transmission is transmitted through the PHICH. Several PHICH groups may be formed from one subframe, and several PHICHs exist in one PHICH group. Accordingly, one PHICH group includes a PHICH for several user equipments.

As shown in FIG. 8, PHICH allocation from several PHICH groups to each user equipment is performed using the lowest physical resource block (PRB) index of PUSCH resource allocation and cyclic shift index for a demodulation RS (DMRS) transmitted through uplink grant PDCCH. The DMRS is an uplink reference signal, and is provided, for channel estimation for uplink data demodulation, together with uplink transmission. Also, the PHICH resource is notified through an index pair such as $(n_{PHICH}^{group}, n_{PHICH}^{seq})$. At this time, in $(n_{PHICH}^{group}, n_{PHICH}^{seq})$, $n_{PHICH}^{group}$ means a PHICH group number, and $n_{PHICH}^{seq}$ means an orthogonal sequence index within the corresponding PHICH group. $n_{PHICH}^{group}$ and $n_{PHICH}^{seq}$ are defined as expressed by the following Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad \text{[Equation 1]}$$

In the Equation 1, $n_{DMRS}$ is a cyclic shift applied to the DMRS used for PHICH associated uplink transmission, and is mapped into a value of a 'cyclic shift for DMRS' field of the most recent uplink grant control information (for example, DCI format 0 or 4) on a transport block (TB) associated with the corresponding PUSCH transmission. For example, the 'cyclic shift for DMRS' field of the most recent uplink grant DCI format may have a 3-bit size. If this field has a value of '000', $n_{DMRS}$ may be set to have '0'.

In the Equation 1, $N_{SF}^{PHICH}$ is a spreading factor size used for PHICH modulation. $I_{PRB\_RA}^{lowest\_index}$ is the lowest PRB index at the first slot of the corresponding PUSCH transmission. $I_{PHICH}$ has a value of 1 only in a specific case (UL/DL configuration 0 is set and PUSCH transmission is performed at subframe n=4 or 9) in a TDD system, and has a value of 0 in other cases. $N_{PHICH}^{group}$ is the number of PHICH groups set by an upper layer, and is defined as expressed by the following Equation 2.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases} \quad \text{[Equation 2]}$$

In the Equation 2, $N_g$ is information on the quanity of PHICH resources transmitted to a physical broadcast channel (PBCH). $N_g$ is expressed as ($N_g \in \{1/6, 1/2, 1, 2\}$) with 2-bit size. In the Equation 2, $N_{RB}^{DL}$ is the number of resource blocks set on the downlink.

Also, an example of orthogonal sequences defined in the existing 3GPP LTE release-8/9 is as illustrated in Table 2 below.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
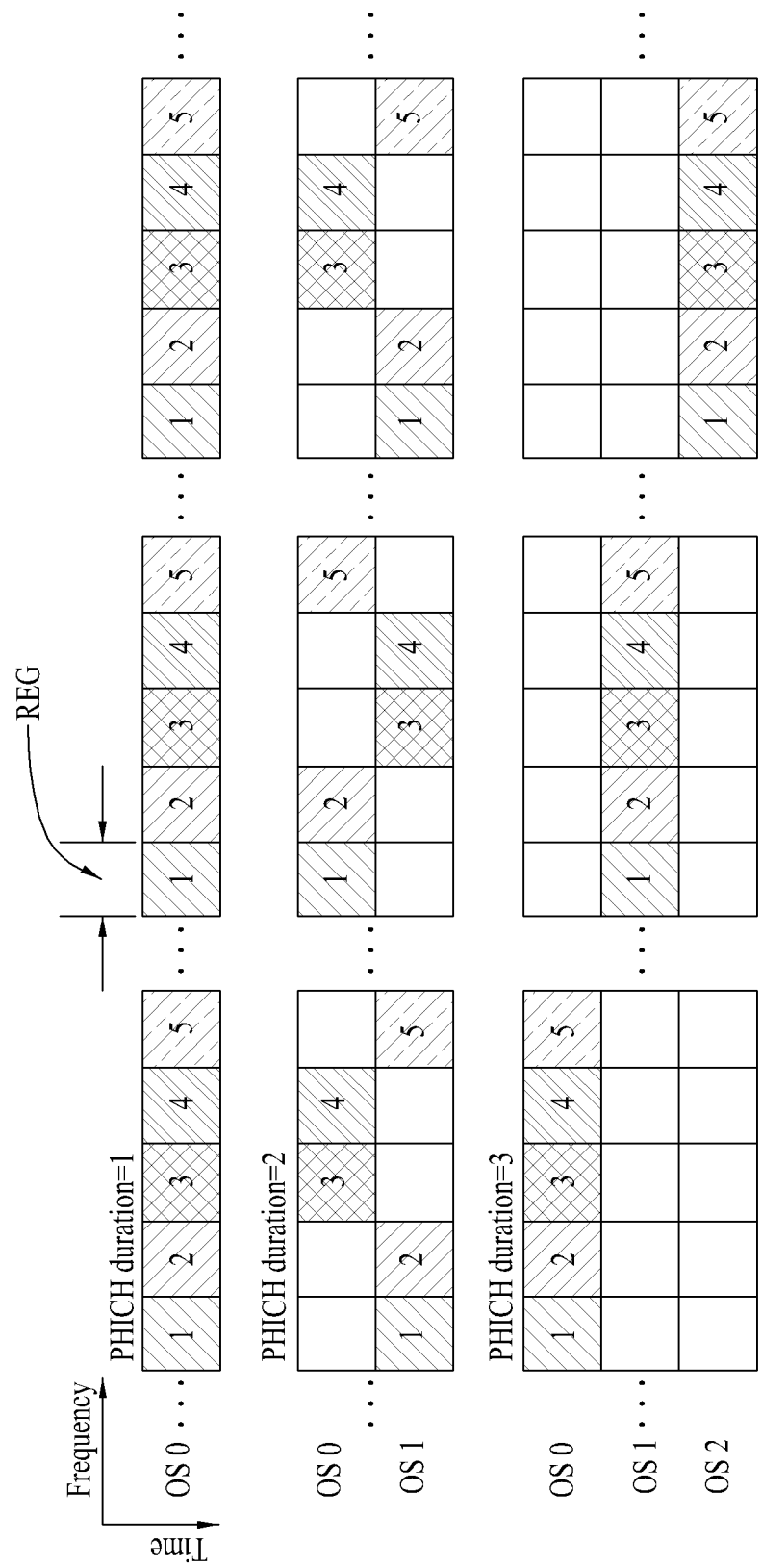
FIG. 9 is a diagram illustrating a location of a downlink resource element into which a PHICH group is mapped.

FIG. 9 is a diagram illustrating a location of a downlink resource element into which a PHICH group is mapped. The PHICH group may be configured on different time domains (that is, different OFDM symbols (OS)) within one subframe, as shown in FIG. 9, depending on PHICH duration.

Uplink Retransmission

Uplink retransmission may be indicated through the aforementioned PHICH and DCI format 0 (DCI format for scheduling PUSCH transmission). The user equipment may perform synchronous non-adaptive retransmission by receiving ACK/NACK for previous uplink transmission through the PHICH, or may perform synchronous adaptive retransmission by receiving uplink grant through the DCI format 0 PDCCH from the base station.

Synchronous transmission means that retransmission is performed at a previously determined timing (for example, the n+kth subframe) after the time (for example, the nth subframe) when one data packet is transmitted (k may be 4, for example). In case of both retransmission based on the PHICH and retransmission based on uplink grant PDCCH, synchronous retransmission is performed.

The same frequency resource and transmission scheme as those (for example, physical resource block (PRB) region and modulation scheme) used for previous transmission are applied to non-adaptive retransmission performed through the PHICH. Meanwhile, in case of adaptive retransmission performed through uplink grant PDCCH, frequency resource and transmission scheme may be set differently from those for previous transmission depending on scheduling control information indicated by the uplink grant.

If the user equipment receives the PHICH and at the same time receives the uplink grant PDCCH, it may perform uplink transmission in accordance with control information of the uplink grant PDCCH by disregarding the PHICH. The uplink grant PDCCH (for example, DCI format 0 or 4) includes a new data indicator (NDI). If a bit of the NDI is toggled as compared with a previous NDI value, the user equipment may transmit new data by regarding that previous transmission has been successfully performed. Meanwhile, even though the user equipment receives ACK for previous transmission through the PHICH, if the NDI value is not toggled from the uplink grant PDCCH received simultaneously with the PHICH or after the PHICH is received, the user equipment is configured so as not to flush a buffer for previous transmission.

Structure of MIMO System

Figure 10:
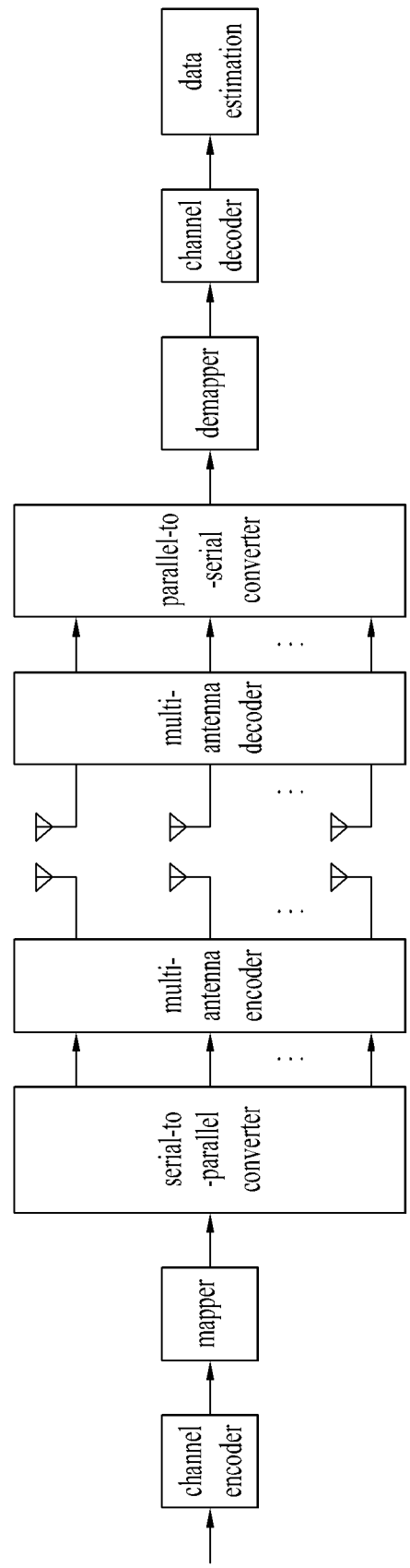
FIG. 10 is a diagram illustrating a basic structure of a MIMO system.

FIG. 10 is a diagram illustrating a basic structure of a MIMO system having multiple transmitting antennas and/or multiple receiving antennas. Each block of FIG. 10 conceptionally illustrates a function or operation for MIMO transmission at a transmitter or receiver.

In FIG. 10, a channel encoder adds redundancy bits to input data bits, whereby noise from a channel may be reduced. A mapper converts data bit information into data symbol information. A serial-to-parallel converter converts serial data into parallel data. A multi-antenna encoder converts data symbols into time-spatial signals. Multiple antennas of the transmitter serve to transmit the time-spatial signals through a channel, and multiple antennas of the receiver serve to receive the signals through the channel.

A multi-antenna decoder of FIG. 10 converts the received time-spatial signals into their respective data symbols. A parallel-to-serial converter converts parallel signals into serial signals. A demapper converts data symbols into data bit information. A channel decoder decodes channel codes. As a result, data may be estimated.

The aforementioned MIMO transmission and reception system may have one or more codewords spatially in accordance with a spatial multiplexing rate. Examples of the MIMO transmission and reception system include a single codeword (SCW) structure having a single codeword spatially and a multiple codeword (MCW) structure having several codewords.

Figure 11:
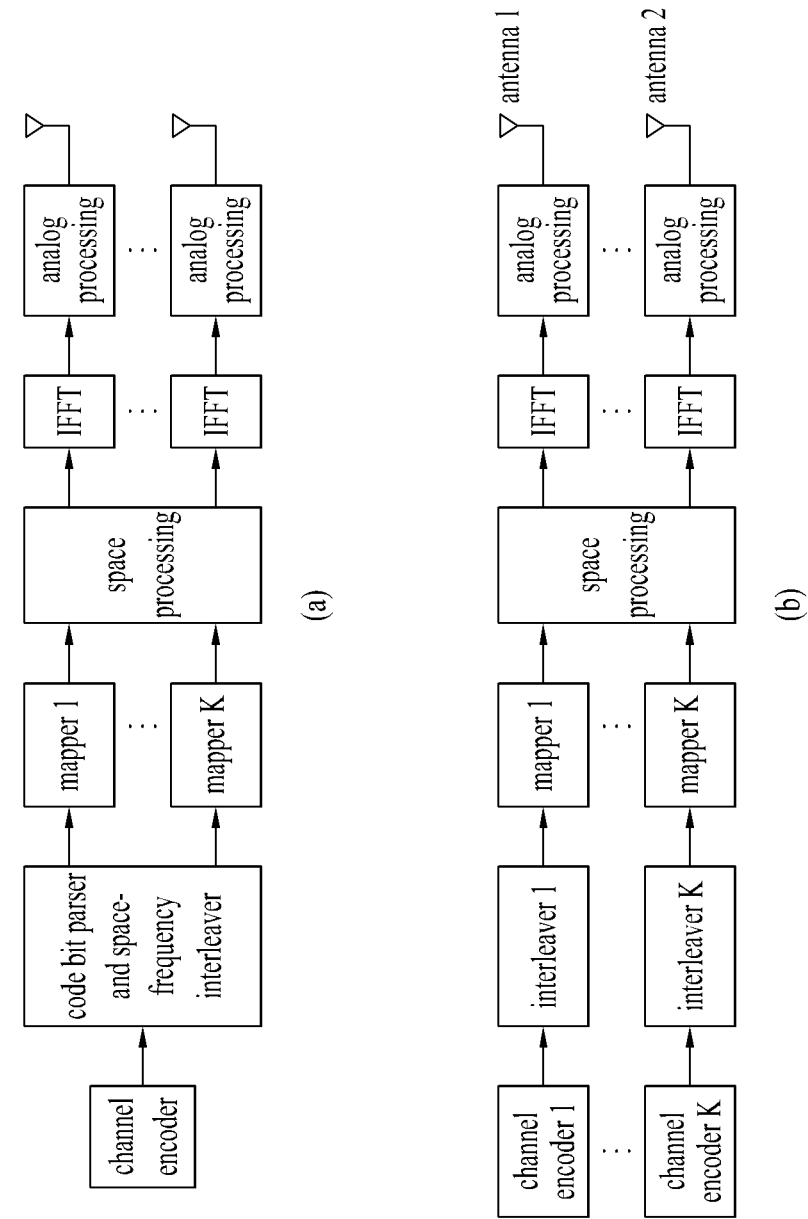
FIG. 11 is a block diagram illustrating a function of a transmitter of a MIMO system having a single codeword and multiple codewords.

FIG. 11(a) is a block diagram illustrating a function of a transmitter of a MIMO system having SCW structure, and FIG. 11(b) is a block diagram illustrating a function of a transmitter of a MIMO system having MCW structure.

Codeword-to-layer mapping relation will be described. If a signal is transmitted using a single antenna, one codeword is mapped into one layer and then transmitted. Meanwhile, if a signal is transmitted using multiple antennas, the codeword-to-layer mapping relation may be as illustrated in the following Table 3 and Table 4 in accordance with a transmission scheme. Table 3 and Table 4 exemplarily illustrate a codeword-to-layer mapping relation in case of transmission of maximum two codewords and transmission of maximum four transmitting antennas.

TABLE 3

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

TABLE 4

| Number of layers | Number of code words | Codeword-to-layer mapping $i = 0, 1, \ldots, M_{symb}^{layer} - 1$ |
|---|---|---|
| 2 | 1 | $x^{(0)}(i) = d^{(0)}(2i)$ $x^{(1)}(i) = d^{(0)}(2i+1)$ $\quad M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $M_{symb}^{layer} = \begin{cases} M_{symb}^{(0)}/4 & \text{if } M_{symb}^{(0)} \bmod 4 = 0 \\ (M_{symb}^{(0)}+2)/4 & \text{if } M_{symb}^{(0)} \bmod 4 \neq 0 \end{cases}$ If $M_{symb}^{(0)} \bmod 4 \neq 0$ two null symbols shall be appended to $d^{(0)}(M_{symb}^{(0)}-1)$ |

Table 3 illustrates an example of signal transmission based on a spatial multiplexing scheme, and Table 4 illustrates an example of signal transmission based on a transmit diversity scheme. Also, in Table 3 and Table 4, $x^{(a)}(i)$ represents the ith symbol of a layer having index a, and $d^{(a)}(i)$ represents the ith symbol of a codeword having index a. A mapping relation between the number of codewords and the number of layers, which are used for transmission, may be noted through "Number of layers" and "Number of codewords" in Table 3 and Table 4. Also, "Codeword-to-Layer mapping" in Table 3 and Table 4 represents how symbols of respective codewords are mapped into a layer.

As will be aware of it from Table 3 and Table 4, although one codeword may be mapped into one layer in a unit of symbol and then transmitted, it may be distributed into maximum four layers and mapped as illustrated in the second row of Table 4. In this way, if one codeword is distributed and mapped into a plurality of layers, it is noted that symbols constituting each codeword may sequentially be mapped per layer and then transmitted.

Carrier Aggregation

The introduction of the carrier aggregation (CA) technology is considered in the advanced OFDM based mobile communication system. The carrier aggregation technology means the technology that may achieve a high data transmission rate by performing uplink/downlink transmission simultaneously using one or more carriers (component carriers (CC) or cells) designated individually for the downlink or the uplink. The system to which the carrier aggregation technology is applied will be referred to as a multiple carrier system. Hereinafter, an uplink carrier which is a target of carrier aggregation will simply be referred to as UL CC or UL cell, and a downlink carrier will simply be referred to as DL CC or DL cell.

For example, the user equipment may monitor and receive downlink signals/data on a plurality of DL cells at the same time. However, even though the base station manages N number of DL cells, if the network configures M (M≤N) number of DL cells for the user equipment, monitoring of the downlink signals/data of the user equipment may be limited to M number of DL cells. Also, if the network configures L (L≤M≤N) number of DL cells as main DL cells, the user equipment may first monitor and receive the downlink signals/data of the L number of DL cells. These L number of DL cells may be expressed as downlink primary cells (DL P-cell) or downlink (DL) anchor cells, and the DL P-cell may be configured user equipment-specifically or cell-specifically.

Also, one user equipment may transmit uplink control information and/or data on one or more UL cells. Alternatively, the uplink control information may be configured to be transmitted from only a specific UL cell (for example, UL P-cell) configured as a main UL cell.

As described above, one user equipment may use a plurality of DL/UL cells in the multiple carrier system. These DL/UL cells may be notified to the user equipment by RRC configuration signal, and the user equipment may receive DL data from the plurality of DL/UL cells or transmit UL data to several UL cells. However, if data traffic of the user equipment is not stable and is concentrated on a specific timing, that is, if data traffic of the user equipment is bursty, the user equipment fails to efficiently use DL/UL cells configured by upper layer signaling (RRC configuration). Accordingly, in order to efficiently use the DL/UL cells and prevent unnecessary power consumption from occurring due to buffering, activation/deactivation of dynamic DL/UL cells may be considered. Dynamic activation/deactivation of the DL/UL cells means that configuration of DL/UL cells to be used by the user equipment is updated more frequently (or quickly) than RRC configuration signaling.

In case of the DL cell, an activation/deactivation method per DL cell or a method for simultaneously activating/deactivating all the DL cells except for specific primary DL cell(s) (for example, DL P-cell) may be used as the dynamic activation/deactivation method. Likewise, dynamic activation/deactivation for the UL cell may be performed. Also, as dynamic activation/deactivation signals for the DL/UL cells, physical layer control signals through the PDCCH may be used, or MAC layer signals through the PDSCH may be used.

Extended PHICH Resource Allocation

In the advanced system (for example, LTE-A system) that supports uplink MIMO transmission, transmission of maximum two codewords may be performed by one uplink transmission entity (for example, user equipment) (this may be referred to as uplink multi-codeword single user-MIMO (SU-MIMO) scheme). Since the existing PHICH has been designed considering uplink single codeword transmission, the existing PHICH resource allocation scheme cannot be applied to the uplink multi-codeword transmission as it is. In other words, in order to support HARQ ACK/NACK transmission for maximum two codewords, a new PHICH resource allocation method should be defined. To this end, transmission of one HARQ ACK/NACK through one PHICH may be considered. In this case, two PHICH resources should be allocated to provide HARQ ACK/NACK for uplink multi-codeword SU-MIMO transmission.

As described in respect of FIG. 8 and Equation 1, the PHICH resources are implicitly associated with the lowest PRB index, and are explicitly allocated by $n_{DMRS}$ (cyclic shift applied to uplink DMRS). In case of uplink multi-user-MIMO (MU-MIMO) transmission in the existing system, different user equipments may be allocated to the same frequency resource block. Since different cyclic shifts of uplink DMRS are set to the different user equipments, different frequency resources and sequence resources (that is, PHICH group ($n_{PHICH}^{group}$) and PHICH sequence ($n_{PHICH}^{seq}$)) may be allocated to each user equipment. Meanwhile, in case of uplink SU-MIMO, one user equipment may have multi-layers, and different cyclic shifts of uplink DMRS are allocated to each layer. Accordingly, allocation of a plurality of different PHICH resources to one user equipment in the uplink SU-MIMO may be considered based on an allocation scheme of different PHICH resources to each of a plurality of user equipments in the existing system (uplink MU-MIMO).

Multi-PHICH Resource Allocation on Uplink SU-MIMO Operation

Maximum two codewords may be used for uplink SU-MIMO transmission. Accordingly, maximum two PHICH resources should be allocated to one user equipment. Considering that the PHICH resources are allocated to each codeword, the two PHICH resources may be defined in accordance with codeword indexes. For example, it may be considered that PHICH resource 0 is allocated to codeword 0 and PHICH resource 1 is allocated to codeword 1. Also, considering that the PHICH resources are defined as expressed by the Equation 1, PHICH resource for a codeword i (i is a codeword index) may be identified by a pair of ($n_{PHICH}^{group}(i), n_{PHICH}^{seq}(i)$). Considering this, each variable that defines the PHICH resources may be defined by a function of codeword indexes to identify multiple PHICH resources allocated to one user equipment. Hereinafter, various embodiments of the present invention in respect of a method for allocating a plurality of PHICH resources to one user equipment will be described in more detail.

Multi-PHICH Resource Allocation Based on Codeword Indexes

Multiple PHICH resources may be allocated based on codeword indexes by simplifying correlation between PHICH resource allocation and codeword indexes. In this case, a codeword specific parameter is added to Equation, which defines single PHICH resource allocation, whereby Equation for multi-PHICH resource allocation may be defined as expressed by Equation 3 below.

$$n_{PHICH}^{group}(i) = (I_{PRB\_RA}^{lowest\_index} + n_{DMRS} + M(i)) \bmod N_{PHICH}^{group}$$

$$n_{PHICH}^{sequence}(i) = (\lfloor I_{PRB\_RA}^{lowest\_index} / N_{PHICH}^{group} \rfloor + n_{DMRS} + M(i)) \bmod 2 N_{SF}^{PHICH} \quad \text{[Equation 3]}$$

In the Equation 3, M(i) is a codeword specific parameter corresponding to the ith codeword (or codeword index i). The codeword specific parameter M(i) may be determined by the codeword index i. Accordingly, a PHICH resource for the first codeword may be allocated in accordance with an allocation rule of one PHICH resource, and frequency and sequence resources adjacent to the PHICH resource for the first codeword may be allocated as a PHICH resource for the second codeword.

Multi-PHICH Resource Allocation Based on Cyclic Shift of Uplink DMRS

In the aforementioned example, the codeword specific parameter has been applied to the PHICH group index ($n_{PHICH}^{group}$), and PHICH sequence index ($n_{PHICH}^{seq}$) allocation, and different PHICH resources have been allocated to each codeword. Hereinafter, of PRB index ($I_{PRB\_RA}^{lowest\_index}$) and DMRS index ($n_{DMRS}$), which determine the PHICH group index ($n_{PHICH}^{group}$) and the PHICH sequence index ($n_{PHICH}^{seq}$), an embodiment that the DMRS index ($n_{DMRS}$) is differently allocated to each codeword will be described in more detail.

In case of uplink SU-MIMO, cyclic shift indexes of uplink DMRS are allocated to their respective layers. Accordingly, the PHICH group index $n_{PHICH}^{group}(i)$ and the PHICH sequence index $n_{PHICH}^{seq}(i)$ for the ith codeword (or codeword index i) may be allocated based on the cyclic shift of the uplink DMRS for the ith codeword. As a result, multi-PHICH resource allocation may be expressed as illustrated in Equation 4 below.

$$n_{PHICH}^{group}(i) = (I_{PRB\_RA}^{lowest\_index} + n_{DMRS}(i)) \bmod N_{PHICH}^{group}$$

$$n_{PHICH}^{sequence}(i) = (\lfloor I_{PRB\_RA}^{lowest\_index}/N_{PHICH}^{group} \rfloor + n_{DMRS}(i)) \bmod 2N_{SF}^{PHICH}$$ [Equation 4]

In the Equation 4, $n_{DMRS}(i)$ is a DMRS cyclic shift index corresponding to the ith codeword.

If two codewords are transmitted through two layers, since a codeword-to-layer mapping relation has a one-to-one mapping relation, codeword indexes may correspond to layer indexes. Meanwhile, if two codewords are transmitted through three or four layers, two of three or four cyclic shift indexes may be selected. For example, two cyclic shift indexes of the first layer into which one codeword is mapped and the first layer into which the other codeword is mapped may be used. In this way, different PHICH resources for each codeword may be allocated using the selected cyclic shift indexes.

For example, if two codewords are transmitted through three layers, the first codeword may be mapped into the first layer, and the second codeword may be mapped into the second and third layers. At this time, the cyclic shift index of the uplink DMRS allocated to the first layer may be used for the first codeword, and the cyclic shift index of the uplink DMRS allocated to the second layer may be used for the second codeword.

For example, if two codewords are transmitted through four layers, the first codeword may be mapped into the first and second layers, and the second codeword may be mapped into the third and fourth layers. At this time, the cyclic shift index of the uplink DMRS allocated to the first layer may be used for the first codeword, and the cyclic shift index of the uplink DMRS allocated to the third layer may be used for the second codeword.

The aforementioned examples are not restrictive, and the present invention includes other examples that one cyclic shift index is used for one codeword and the other cyclic shift index is used for the other codeword to allocate different PHICH resources to each codeword. For example, if two codewords are transmitted through four layers, the cyclic shift index of the uplink DMRS allocated to the second layer may be used for the first codeword, and the cyclic shift index of the uplink DMRS allocated to the fourth layer may be used for the second codeword.

In the uplink single antenna transmission system (for example, 3GPP LTE release-8 or 9 system), eight cyclic shift values are defined as uplink DMRS resources. One of 0 to 7 values may be allocated to $n_{DMRS}$ in accordance with a mapping relation between $n_{DMRS}$ and a value of a 'cyclic shift for DMRS' field of uplink grant DCI format (for example, DCI format 0 or 4).

In the meantime, cyclic shifts of DMRS for each layer, that is, at least two DMRS cyclic shifts should be supported for channel estimation for each layer in multi-layer transmission. If only one 'cyclic shift for DMRS' field is defined in the uplink grant DCI format (for example, DCI format 0 or 4) for uplink SU-MIMO, the cyclic shift index indicated by this field may be used for mapping into $n_{DMRS}^{(2)}$ for reference signal sequence and mapping into $n_{DMRS}$ for PHICH resource allocation. Table 5 illustrates a mapping relation in 'cyclic shift for DMRS', $n_{DMRS}^{(2)}$ and $n_{DMRS}$.

TABLE 5

| Cyclic Shift for DMRS Field in DCI format 0 | $n_{DMRS}^{(2)}$ | $n_{DMRS}$ |
|---|---|---|
| 000 | 0 | 0 |
| 001 | 6 | 1 |
| 010 | 3 | 2 |
| 011 | 4 | 3 |
| 100 | 2 | 4 |
| 101 | 8 | 5 |
| 110 | 10 | 6 |
| 111 | 9 | 7 |

If a 'cyclic shift for DMRS' field of the uplink grant DCI format indicates a specific value in accordance with the mapping relation of Table 5, one $n_{DMRS}^{(2)}$ and one $n_{DMRS}$ corresponding to the specific value may be determined. A previously defined rule may be applied to allocation of another index $n_{DMRS}^{(2)}$ other than one index $n_{DMRS}^{(2)}$ RS determined directly by the 'cyclic shift for DMRS' field. In other words, allocation of another index $n_{DMRS}^{(2)}$ may not be determined directly by the 'cyclic shift for DMRS' field but be determined implicitly in accordance with the previously determined rule. Also, for allocation of another index $n_{DMRS}$ other than one index $n_{DMRS}$ determined directly by the 'cyclic shift for DMRS' field, since values of $n_{DMRS}^{(2)}$ and $n_{DMRS}$ are associated with the 'cyclic shift for DMRS' field as illustrated in Table 5, the index relation of $n_{DMRS}^{(2)}$ and $n_{DMRS}$ may be considered.

For example, if the 'cyclic shift for DMRS' field of the uplink grant DCI format is indicated by '000', index '0' may be determined for $n_{DMRS}^{(2)}$, DMRS and index '0' may be determined for $n_{DMRS}$. Also, index '6' may be determined for another $n_{DMRS}^{(2)}$ in accordance with the previously determined rule. Also, index '1' may be determined for another $n_{DMRS}$ in accordance with the mapping relation of $n_{DMRS}^{(2)}$ and $n_{DMRS}$.

As described in respect of the aforementioned Equation 1 or 4, the PHICH resources are identified by a pair of $n_{PHICH}^{group}$ and $n_{PHICH}^{seq}$, and each of $n_{PHICH}^{group}$ and $n_{PHICH}^{seq}$ is determined by $n_{DMRS}$. If different cyclic shift indexes are allocated multiple layers transmitted from one user equipment as above, different PHICH resources (that is, $n_{PHICH}^{group}$ and $n_{PHICH}^{seq}$) may be determined by a PHICH resource allocation scheme based on DMRS cyclic shift indexes.

As described above, the method for allocating multiple PHICH resources using a codeword specific DMRS index will be described in more detail.

Each of the PHICH group index ($n_{PHICH}^{group}$) and the PHICH sequence index ($n_{PHICH}^{seq}$) may be allocated in accordance with DMRS index ($n_{DMRS}$). The PHICH group index and the PHICH sequence index for each codeword may be allocated by a codeword specific parameter related to the DMRS index. In other words, in the Equation 4, if $n_{DMRS}(i)$ is expressed by $n_{DMRS}+M(i)$ the PHICH group index and the PHICH sequence index ($n_{PHICH}^{group}(i)$ and $n_{PHICH}^{seq}(i)$) for the ith codeword may be defined as expressed by Equation 5 below.

$$n_{PHICH}^{group}(i) = (I_{PRB\_RA}^{lowest\_index} + (n_{DMRS} + M(i))) \bmod N_{PHICH}^{group}$$

$$n_{PHICH}^{sequence}(i) = (\lfloor I_{PRB\_RA}^{lowest\_index}/N_{PHICH}^{group} \rfloor + (n_{DMRS} + M(i))) \bmod 2N_{SF}^{PHICH} \quad \text{[Equation 5]}$$

It is noted from the Equation 5 that both the PHICH group index ($n_{PHICH}^{group}$) and the PHICH sequence index ($n_{PHICH}^{seq}$) are determined by the DMRS index based on the codeword specific parameter. However, any one of the PHICH group index ($n_{PHICH}^{group}$) and the PHICH sequence index ($n_{PHICH}^{seq}$) may be determined by the DMRS index based on the codeword specific parameter. This may be expressed by the following Equations 6 and 7.

$$n_{PHICH}^{group}(i) = (I_{PRB\_RA}^{lowest\_index} + (n_{DMRS} + M(i))) \bmod N_{PHICH}^{group}$$

$$n_{PHICH}^{sequence}(i) = (\lfloor I_{PRB\_RA}^{lowest\_index}/N_{PHICH}^{group} \rfloor + n_{DMRS}) \bmod 2N_{SF}^{PHICH} \quad \text{[Equation 6]}$$

$$n_{PHICH}^{group}(i) = (I_{PRB\_RA}^{lowest\_index} + n_{DMRS}) \bmod N_{PHICH}^{group}$$

$$n_{PHICH}^{sequence}(i) = (\lfloor I_{PRB\_RA}^{lowest\_index}/N_{PHICH}^{group} \rfloor + (n_{DMRS} + M(i))) \bmod 2N_{SF}^{PHICH} \quad \text{[Equation 7]}$$

The Equation 6 means that only the PHICH group index ($n_{PHICH}^{group}$) is determined by the DMRS index based on the codeword specific parameter (M(i)), and the Equation 7 means that only the PHICH sequence index ($n_{PHICH}^{seq}$) is determined by the DMRS index based on the codeword specific parameter (M(i)).

In the Equations 5 to 7, M(i) representing the codeword specific parameter may be defined as a parameter having different features or different values per codeword or PHICH resource.

For example, the codeword specific parameter M(i) may be defined as the codeword index (M(i)=i). Alternatively, the codeword specific parameter M(i) may be defined as a level of a modulation and coding scheme (MCS) per codeword (M(i)=MCS_i). Alternatively, the codeword specific parameter M(i) may be defined using a specific offset value related to the codeword index (M(i)=i·α). Alternatively, the codeword specific parameter M(i) may be defined using the number ($N=_{RB}^{UL}$) of cell specific resource blocks allocated for uplink transmission as an offset value (M(i)=i·$N=_{RB}^{UL}$). However, the codeword specific parameter is not limited to the aforementioned examples, and the present invention includes that various codeword specific parameters are applied to the DMRS index of PHICH resource allocation.

In the meantime, the PHICH group index ($n_{PHICH}^{group}$) and the PHICH sequence index ($n_{PHICH}^{seq}$) may be allocated to each codeword in view of single carrier, or may be allocated to multiple carriers. For example, if carrier aggregation is used, index of multiple codewords transmitted on one carrier (or cell) will be referred to as i, and a carrier index used on multiple carriers will be referred to as c, wherein the index c of the carrier (or cell) may be a virtual number or physical number. In this case, the PHICH group index and the PHICH sequence index for each codeword and each carrier (or cell) may be expressed by the following Equation 8.

$$n_{PHICH}^{group}(i,c) = ((I_{PRB\_RA}^{lowest\_index}(c) + M(i,c)) + n_{DMRS}(i,c) + N(i,c)) \bmod N_{PHICH}^{group}$$

$$n_{PHICH}^{sequence}(i,c) = (\lfloor (I_{PRB\_RA}^{lowest\_index}(c) + M(i,c))/N_{PHICH}^{group} \rfloor + n_{DMRS}(i,c) + N(i,c)) \bmod 2N_{SF}^{PHICH} \quad \text{[Equation 8]}$$

M(i,c) of the Equation 8, which is a codeword specific parameter for PRB index, will be described later, and N(i,c) which is a codeword specific parameter for DMRS index, will now be described.

As expressed in the Equation 8, DMRS cyclic shift index ($n_{DMRS}$) may be set to have different values per carrier (c) and codeword (i). Also, a specific value (N(i,c)) mapped into the DMRS cyclic shift index may be set carrier and codeword specifically.

In the meantime, the DMRS cyclic shift index ($n_{DMRS}$) may be set to have different values per carrier (c) and codeword (i), and the specific value (N(i)) mapped into the DMRS cyclic shift index may be set to have different values per codeword. This may be expressed by the following Equation 9.

$$n_{PHICH}^{group}(i,c) = ((I_{PRB\_RA}^{lowest\_index}(c) + M(c)) + n_{DMRS}(i,c) + N(i)) \bmod N_{PHICH}^{group}$$

$$n_{PHICH}^{sequence}(i,c) = (\lfloor (I_{PRB\_RA}^{lowest\_index}(c) + M(c))/N_{PHICH}^{group} \rfloor + n_{DMRS}(i,c) + N(i)) \bmod 2N_{SF}^{PHICH} \quad \text{[Equation 9]}$$

In the meantime, the DMRS cyclic shift index ($n_{DMRS}$) may be set to have different values per carrier (c), and the specific value (N(i)) mapped into the DMRS cyclic shift index may be set to have different values per codeword. This may be expressed by the following Equation 10.

$$n_{PHICH}^{group}(i,c) = ((I_{PRB\_RA}^{lowest\_index}(c) + M(c)) + n_{DMRS}(c) + N(i)) \bmod N_{PHICH}^{group}$$

$$n_{PHICH}^{sequence}(i,c) = (\lfloor (I_{PRB\_RA}^{lowest\_index}(c) + M(c))/N_{PHICH}^{group} \rfloor + n_{DMRS}(c) + N(i)) \bmod 2N_{SF}^{PHICH} \quad \text{[Equation 10]}$$

As described above, among the factors that determine the PHICH group index ($n_{PHICH}^{group}$) and the PHICH sequence index ($n_{PHICH}^{seq}$) the DMRS index ($n_{DMRS}$) may be allocated differently per carrier (c) and/or codeword (i), whereby multiple PHICH resources may be allocated to one user equipment.

In the meantime, orthogonal cover code (OCC) may be used for code division multiplexing (CDM) of the DMRS. For example, Walsh code or OCC of DFT (Discrete Fourier Transform) matrix may be used to identify different DMRSs from one another. The OCC may additionally be defined in the 'cyclic shift for DMRS' field of the uplink grant format (for example, DCI format 0 or 4), whereby the uplink transmission entity may use the OCC in generating the DMRS.

In case of MU-MIMO, different user equipments may have different OCCs while having the same DMRS cyclic shift index. In this case, an additional variable may be considered for PHICH resource allocation in case of MU-MIMO. For example, if OCC is used, OCC index may be considered as an additional variable of PHICH resource allocation. As a result, the possibility of collision in PHICH resource allocation may be reduced.

Multi-PHICH Resource Allocation Based on Physical Resource Block (PRB) Index

As described above, the PHICH resources are defined by an index pair such as $n_{PHICH}^{group}$ and $n_{PHICH}^{seq}$. Hereinafter, in PRB index ($I_{PRB\_RA}^{lowest\_index}$) and DMRS index ($n_{DMRS}$), which are factors determining the PHICH group index ($n_{PHICH}^{group}$) and the PHICH sequence index ($n_{PHICH}^{seq}$) an embodiment that the PRB index ($I_{PRB\_RA}^{lowest\_index}$) is allocated differently per codeword will be described. In other words, it may be considered that different PRB indexes per codeword are allocated to allocate multiple PHICH resources. For example, the PHICH resource for the first codeword may be allocated by the lowest PRB index ($I_{PRB\_RA}^{lowest\_index}$), and the PHICH resource for the second codeword may be allocated by virtual increment of the PRB index. As a result, multi-PHICH resource allocation may be expressed by the following Equation 11.

$$n_{PHICH}^{group}(i)=((I_{PRB\_RA}^{lowest\_index}+i)+n_{DMRS}) \bmod N_{PHICH}^{group}$$

$$n_{PHICH}^{sequence}(i)=(\lfloor(I_{PRB\_RA}^{lowest\_index}+i)/N_{PHICH}^{group}\rfloor+n_{DMRS}) \bmod 2N_{SF}^{PHICH} \quad \text{[Equation 11]}$$

Since adjacent PUSCH resource blocks are associated with multiple PHICH resources of different PHICH groups in accordance with the Equation 11, in this embodiment, effective PHICH resource allocation may be performed if two or more PRBs are allocated to the PUSCH.

Supposing that the DMRS index is fixed, the PHICH group index is increased in accordance with increase of the PRB indexes. Also, the adjacent PUSCH resource blocks always have different PHICH group indexes. Accordingly, even though the same PHICH sequence index is allocated to adjacent PRBs, PHICH resource collision between the adjacent PRBs may be avoided by the PHICH group indexes. Also, in case of MU-MIMO, DMRS index allocation may be controlled, whereby different PHICH resources may be allocated to a plurality of user equipments. In this case, in the multi-PHICH resource allocation scheme based on different PRB indexes, two or more PRBs should be allocated to the PUSCH.

As described above, the method for allocating multiple PHICH resources using a codeword specific PRB index will be described in more detail.

Each of the PHICH group index ($n_{PHICH}^{group}$) and the PHICH sequence index ($n_{PHICH}^{seq}$) may be allocated in accordance with PRB index ($I_{PRB\_RA}^{lowest\_index}$). The PHICH group index and the PHICH sequence index for each codeword (CW) may be allocated by a codeword specific parameter related to the PRB index. In other words, if $I_{PRB\_RA}^{lowest\_index}+i$ of the Equation 11 is expressed by $I_{PRB\_RA}^{lowest\_index}+M(i)$ the PHICH group index and the PHICH sequence index ($n_{PHICH}^{group}(i)$ and $n_{PHICH}^{seq}(i)$) for the ith codeword may be defined as expressed by Equation 12 below.

$$n_{PHICH}^{group}(i)=((I_{PRB\_RA}^{lowest\_index}+M(i))+n_{DMRS}) \bmod N_{PHICH}^{group}$$

$$n_{PHICH}^{sequence}(i)=(\lfloor(I_{PRB\_RA}^{lowest\_index}+M(i))/N_{PHICH}^{group}\rfloor+n_{DMRS}) \bmod 2N_{SF}^{PHICH} \quad \text{[Equation 12]}$$

It is noted from the Equation 12 that both the PHICH group index ($n_{PHICH}^{group}$) and the PHICH sequence index ($n_{PHICH}^{seq}$) are determined by the PRB index based on the codeword specific parameter. However, any one of the PHICH group index ($n_{PHICH}^{group}$) and the PHICH sequence index ($n_{PHICH}^{seq}$) may be determined by the PRB index based on the codeword specific parameter. This may be expressed by the following Equations 13 and 14.

$$n_{PHICH}^{group}(i)=((I_{PRB\_RA}^{lowest\_index}+M(i))+n_{DMRS}) \bmod N_{PHICH}^{group}$$

$$n_{PHICH}^{sequence}(i)=(\lfloor I_{PRB\_RA}^{lowest\_index}/N_{PHICH}^{group}\rfloor+n_{DMRS}) \bmod 2N_{SF}^{PHICH} \quad \text{[Equation 13]}$$

$$n_{PHICH}^{group}(i)=(I_{PRB\_RA}^{lowest\_index}+n_{DMRS}) \bmod N_{PHICH}^{group}$$

$$n_{PHICH}^{sequence}(i)=(\lfloor(I_{PRB\_RA}^{lowest\_index}+M(i))/N_{PHICH}^{group}\rfloor+n_{DMRS}) \bmod 2N_{SF}^{PHICH} \quad \text{[Equation 14]}$$

The Equation 13 means that only the PHICH group index ($n_{PHICH}^{group}$) is determined by the PRB index based on the codeword specific parameter (M(i)), and the Equation 14 means that only the PHICH sequence index ($n_{PHICH}^{seq}$) is determined by the PRB index based on the codeword specific parameter (M(i)).

In the Equations 12 to 14, M(i) representing the codeword specific parameter may be defined as a parameter having different features or different values per codeword or PHICH resource.

For example, the codeword specific parameter M(i) may be defined as the codeword index (M(i)=i). Alternatively, the codeword specific parameter M(i) may be defined as a level of a modulation and coding scheme (MCS) per codeword (M(i)=MCS_i). Alternatively, the codeword specific parameter M(i) may be defined using a specific offset value related to the codeword index (M(i)=i·α). Alternatively, the codeword specific parameter M(i) may be defined using the number ($N_{RB}^{UL}$) of cell specific resource blocks allocated for uplink transmission as an offset value (M(i)=i·$N_{RB}^{UL}$). However, the codeword specific parameter is not limited to the aforementioned examples, and the present invention includes that various codeword specific parameters are applied to the PRB index of PHICH resource allocation.

In the meantime, the PHICH group index ($n_{PHICH}^{group}$) and the PHICH sequence index ($n_{PHICH}^{seq}$) may be allocated to each codeword in view of single carrier, or may be allocated to multiple carriers. For example, if carrier aggregation is used, index of multiple codewords transmitted on one carrier (or cell) will be referred to as i, and a carrier index used on multiple carriers will be referred to as c, wherein the index c of the carrier (or cell) may be a virtual number or physical number. In this case, the PHICH group index and the PHICH sequence index for each codeword and each carrier (or cell) may be expressed by the following Equation 15.

$$n_{PHICH}^{group}(i,c)=((I_{PRB\_RA}^{lowest\_index}(c)+M(i,c))+n_{DMRS}(i,c)+N(i,c)) \bmod N_{PHICH}^{group}$$

$$n_{PHICH}^{sequence}(i,c)=(\lfloor(I_{PRB\_RA}^{lowest\_index}(c)+M(i,c))/N_{PHICH}^{group}\rfloor+n_{DMRS}(i,c)+N(i,c)) \bmod 2N_{SF}^{PHICH} \quad \text{[Equation 15]}$$

In the Equation 15, N(i,c), which is a codeword specific parameter for DMRS, has been described with reference to the Equation 8. M(i,c), which is a codeword specific parameter for PRB index, will now be described. As expressed in the Equation 15, PRB index ($I_{PRB\_RA}^{lowest\_index}$) may be set to have different values per carrier (c) and codeword (i). Also, a specific value (M(i,c)) mapped into the PRB index may be set carrier and codeword specifically.

In the meantime, the PRB index ($I_{PRB\_RA}^{lowest\_index}$) may be set to have different values per carrier (c) and codeword (i), and the specific value (M(i)) mapped into the PRB index may be set to have different values per codeword. This may be expressed by the following Equation 16.

$$n_{PHICH}^{group}=((I_{PRB\_RA}^{lowest\_index}(i,c)+M(i))+n_{DMRS}(c)+N(c)) \bmod N_{PHICH}^{group}$$

$$n_{PHICH}^{seq}=(\lfloor(I_{PRB\_RA}^{lowest\_index}(i,c)+M(i))/N_{PHICH}^{group}\rfloor+n_{DMRS}(c)+N(c)) \bmod 2N_{SF}^{PHICH} \quad \text{[Equation 16]}$$

In the meantime, the PRB index ($I_{PRB\_RA}^{lowest\_index}$) may be set to have different values per carrier (c), and the specific value (M(i)) mapped into the PRB index may be set to have different values per codeword. This may be expressed by the following Equation 17.

$$n_{PHICH}^{group}=((I_{PRB\_RA}^{lowest\_index}(i)+M(i))+n_{DMRS}(c)+N(c)) \bmod N_{PHICH}^{group}$$

$$n_{PHICH}^{seq}=(\lfloor(I_{PRB\_RA}^{lowest\_index}(c)+M(i))/N_{PHICH}^{group}\rfloor+n_{DMRS}(c)+N(c)) \bmod 2N_{SF}^{PHICH} \quad \text{[Equation 17]}$$

As described above, among the factors that determine the PHICH group index ($n_{PHICH}^{group}$) and the PHICH sequence index ($n_{PHICH}^{seq}$) the PRB index ($I_{PRB\_RA}^{lowest\_index}$) may be allocated differently per carrier (c) and/or codeword (i), whereby multiple PHICH resources may be allocated to one user equipment.

Multi-PHICH Resource Allocation Based on (I,Q) Components of QPSK Symbol

In multi-PHICH resource allocation, the same PHICH group index may be allocated to each of two codewords and at the same time different PHICH sequence indexes may be allocated thereto. In this case, PHICH resource allocation may be expressed by the following Equation 18.

$$n_{PHICH}^{group}(i) = ((I_{PRB\_RA}^{lowest\_index}) + n_{DMRS}) \bmod N_{PHICH}^{group}$$

$$n_{PHICH}^{sequence}(i) = (\lfloor I_{PRB\_RA}^{lowest\_index}/N_{PHICH}^{group} \rfloor + n_{DMRS} + n(i)) \bmod 2N_{SF}^{PHICH}$$

[Equation 18]

where, $n(i) = i \cdot N_{SF}^{PHICH}$

In the Equation 18, as the codeword specific parameter is applied to the PHICH sequence index, different PHICH resources may be allocated to each codeword. As the codeword specific parameter (that is, increment n(i)) is applied to each PHICH sequence resource within one PHICH group, different PHICH sequences may be allocated to each codeword. In the Equation 18, since $N_{SF}^{PHICH}$ is a spreading factor size used for PHICH modulation, if an increment value is the same as the spreading factor (SF) size, quadrature phase shift keying (QPSK) symbols are generated within one PHICH group by two PHICH sequences for two codewords. For example, the PHICH sequence resource for the first codeword may correspond to the component I of one QPSK symbol, and the PHICH sequence resource for the second codeword may correspond to the component Q of the same QPSK symbol. This embodiment may correspond to an example of multi-PHICH resource allocation based on the cyclic shift index of the uplink DMRS, and the PHICH resource may be allocated more efficiently in accordance with this embodiment.

In the meantime, if the PHICH sequence resources are allocated as expressed by the Equation 18 in allocating the PHICH resources to a plurality of user equipments, the PHICH sequence for the second codeword, which is allocated to a user equipment, may collide with the PHICH sequence allocated to another user equipment. However, even though PHICH sequence collision between the user equipments occurs, it is advantages in that it is possible to use the resources more efficiently by using the components (I, Q) of the QPSK symbol within one PHICH group.

Example of PHICH Group Index and PHICH Sequence Index

As described with reference to the Equation 1, the number ($N_{PHICH}^{group}$) of PHICH groups set by the upper layer is applied to calculation of the PHICH group index ($n_{PHICH}^{group}$) and the PHICH sequence index ($n_{PHICH}^{seq}$), which identify the PHICH resources. Also, as described with reference to the Equation 2, $N_{PHICH}^{group}$ may be calculated by information ($N_g$) on the amount of the PHICH resources and the number ($N_{RB}^{DL}$) of resource blocks set on the downlink.

For example, the number of PHICH groups based on $N_g$ and $N_{RB}^{DL}$ is as illustrated in Table 6 below.

TABLE 6

| | Normal CP case | | | | Extended CP case | | | |
|---|---|---|---|---|---|---|---|---|
| | Ng | | | | | | | |
| $N_{RB}^{DL}$ | 1/6 | 1/2 | 1 | 2 | 1/6 | 1/2 | 1 | 2 |
| 6 | 1 | 1 | 1 | 2 | 2 | 2 | 2 | 4 |
| 15 | 1 | 1 | 2 | 4 | 2 | 2 | 4 | 8 |
| 25 | 1 | 2 | 4 | 7 | 2 | 4 | 8 | 14 |
| 50 | 2 | 4 | 7 | 13 | 4 | 8 | 14 | 26 |
| 75 | 2 | 5 | 10 | 19 | 4 | 10 | 20 | 38 |
| 100 | 3 | 7 | 13 | 25 | 6 | 14 | 26 | 50 |

Table 7 and Table 8 illustrate the PHICH group index and the PHICH sequence index, respectively, in case of normal CP, $N_{RB}^{DL}=6$, and $N_g=1/6$.

TABLE 7

| | | $I_{PRB}$ | | | | | |
|---|---|---|---|---|---|---|---|
| $n^{(2)}_{DMRS}$ | $n_{DMRS}$ | 0 | 1 | 2 | 3 | 4 | 5 |
| 0 | 0 | 0 | 0 | 0 | 0 | 0 | 0 |
| 6 | 1 | 0 | 0 | 0 | 0 | 0 | 0 |
| 3 | 2 | 0 | 0 | 0 | 0 | 0 | 0 |
| 4 | 3 | 0 | 0 | 0 | 0 | 0 | 0 |
| 2 | 4 | 0 | 0 | 0 | 0 | 0 | 0 |
| 8 | 5 | 0 | 0 | 0 | 0 | 0 | 0 |
| 10 | 6 | 0 | 0 | 0 | 0 | 0 | 0 |
| 9 | 7 | 0 | 0 | 0 | 0 | 0 | 0 |

TABLE 8

| | | $I_{PRB}$ | | | | | |
|---|---|---|---|---|---|---|---|
| $n^{(2)}_{DMRS}$ | $n_{DMRS}$ | 0 | 1 | 2 | 3 | 4 | 5 |
| 0 | 0 | 0 | 1 | 2 | 3 | 4 | 5 |
| 6 | 1 | 1 | 2 | 3 | 4 | 5 | 6 |
| 3 | 2 | 2 | 3 | 4 | 5 | 6 | 7 |
| 4 | 3 | 3 | 4 | 5 | 6 | 7 | 0 |
| 2 | 4 | 4 | 5 | 6 | 7 | 0 | 1 |
| 8 | 5 | 5 | 6 | 7 | 0 | 1 | 2 |
| 10 | 6 | 6 | 7 | 0 | 1 | 2 | 3 |
| 9 | 7 | 7 | 0 | 1 | 2 | 3 | 4 |

Table 9 and Table 10 illustrate the PHICH group index and the PHICH sequence index, respectively, in case of normal CP, $N_{RB}^{DL}=6$, and $N_g=2$.

TABLE 9

| | | $I_{PRB}$ | | | | | |
|---|---|---|---|---|---|---|---|
| $n^{(2)}_{DMRS}$ | $n_{DMRS}$ | 0 | 1 | 2 | 3 | 4 | 5 |
| 0 | 0 | 0 | 1 | 0 | 1 | 0 | 1 |
| 6 | 1 | 1 | 0 | 1 | 0 | 1 | 0 |
| 3 | 2 | 0 | 1 | 0 | 1 | 0 | 1 |
| 4 | 3 | 1 | 0 | 1 | 0 | 1 | 0 |
| 2 | 4 | 0 | 1 | 0 | 1 | 0 | 1 |
| 8 | 5 | 1 | 0 | 1 | 0 | 1 | 0 |
| 10 | 6 | 0 | 1 | 0 | 1 | 0 | 1 |
| 9 | 7 | 1 | 0 | 1 | 0 | 1 | 0 |

TABLE 10

| $n^{(2)}_{DMRS}$ | $n_{DMRS}$ | \multicolumn{6}{c}{$I_{PRB}$} |
|---|---|---|---|---|---|---|---|
| | | 0 | 1 | 2 | 3 | 4 | 5 |
| 0 | 0 | 0 | 0 | 1 | 1 | 2 | 2 |
| 6 | 1 | 1 | 1 | 2 | 2 | 3 | 3 |
| 3 | 2 | 2 | 2 | 3 | 3 | 4 | 4 |
| 4 | 3 | 3 | 3 | 4 | 4 | 5 | 5 |
| 2 | 4 | 4 | 4 | 5 | 5 | 6 | 6 |
| 8 | 5 | 5 | 5 | 6 | 6 | 7 | 7 |
| 10 | 6 | 6 | 6 | 7 | 7 | 0 | 0 |
| 9 | 7 | 7 | 7 | 0 | 0 | 1 | 1 |

Table 11 and Table 12 illustrate the PHICH group index and the PHICH sequence index, respectively, in case of extended CP, $N_{RB}^{DL}=6$, and $N_g=2$.

TABLE 11

| $n^{(2)}_{DMRS}$ | $n_{DMRS}$ | \multicolumn{6}{c}{$I_{PRB}$} |
|---|---|---|---|---|---|---|---|
| | | 0 | 1 | 2 | 3 | 4 | 5 |
| 0 | 0 | 0 | 1 | 0 | 1 | 0 | 1 |
| 6 | 1 | 1 | 0 | 1 | 0 | 1 | 0 |
| 3 | 2 | 0 | 1 | 0 | 1 | 0 | 1 |
| 4 | 3 | 1 | 0 | 1 | 0 | 1 | 0 |
| 2 | 4 | 0 | 1 | 0 | 1 | 0 | 1 |
| 8 | 5 | 1 | 0 | 1 | 0 | 1 | 0 |
| 10 | 6 | 0 | 1 | 0 | 1 | 0 | 1 |
| 9 | 7 | 1 | 0 | 1 | 0 | 1 | 0 |

TABLE 12

| $n^{(2)}_{DMRS}$ | $n_{DMRS}$ | \multicolumn{6}{c}{$I_{PRB}$} |
|---|---|---|---|---|---|---|---|
| | | 0 | 1 | 2 | 3 | 4 | 5 |
| 0 | 0 | 0 | 0 | 1 | 1 | 2 | 2 |
| 6 | 1 | 1 | 1 | 2 | 2 | 3 | 3 |
| 3 | 2 | 2 | 2 | 3 | 3 | 0 | 0 |
| 4 | 3 | 3 | 3 | 0 | 0 | 1 | 1 |
| 2 | 4 | 0 | 0 | 1 | 1 | 2 | 2 |
| 8 | 5 | 1 | 1 | 2 | 2 | 3 | 3 |
| 10 | 6 | 2 | 2 | 3 | 3 | 0 | 0 |
| 9 | 7 | 3 | 3 | 0 | 0 | 1 | 1 |

As described above, if one user equipment performs uplink multi-codeword transmission, HARQ ACK/NACK for each codeword should be provided from the base station to the corresponding user equipment. In this case, one PHICH resource may be allocated per each codeword, and two PHICH resources may be allocated to one user equipment for uplink transmission of two codewords. As described through various embodiments of the present invention, one PHICH resource may be identified by a pair of ($n_{PHICH}^{group}(i)$, $n_{PHICH}^{seq}(i)$) is a codeword index), multi-PHICH resource allocation to one user equipment may be performed in such a manner that DMRS cyclic shift index, PRB index, etc. are allocated per codeword and/or carrier.

A method for transmitting and receiving downlink HARQ ACK/NACK information and a method for allocating PHICH resources in accordance with the preferred embodiment of the present invention will be described with reference to FIG. 12.

Figure 12:
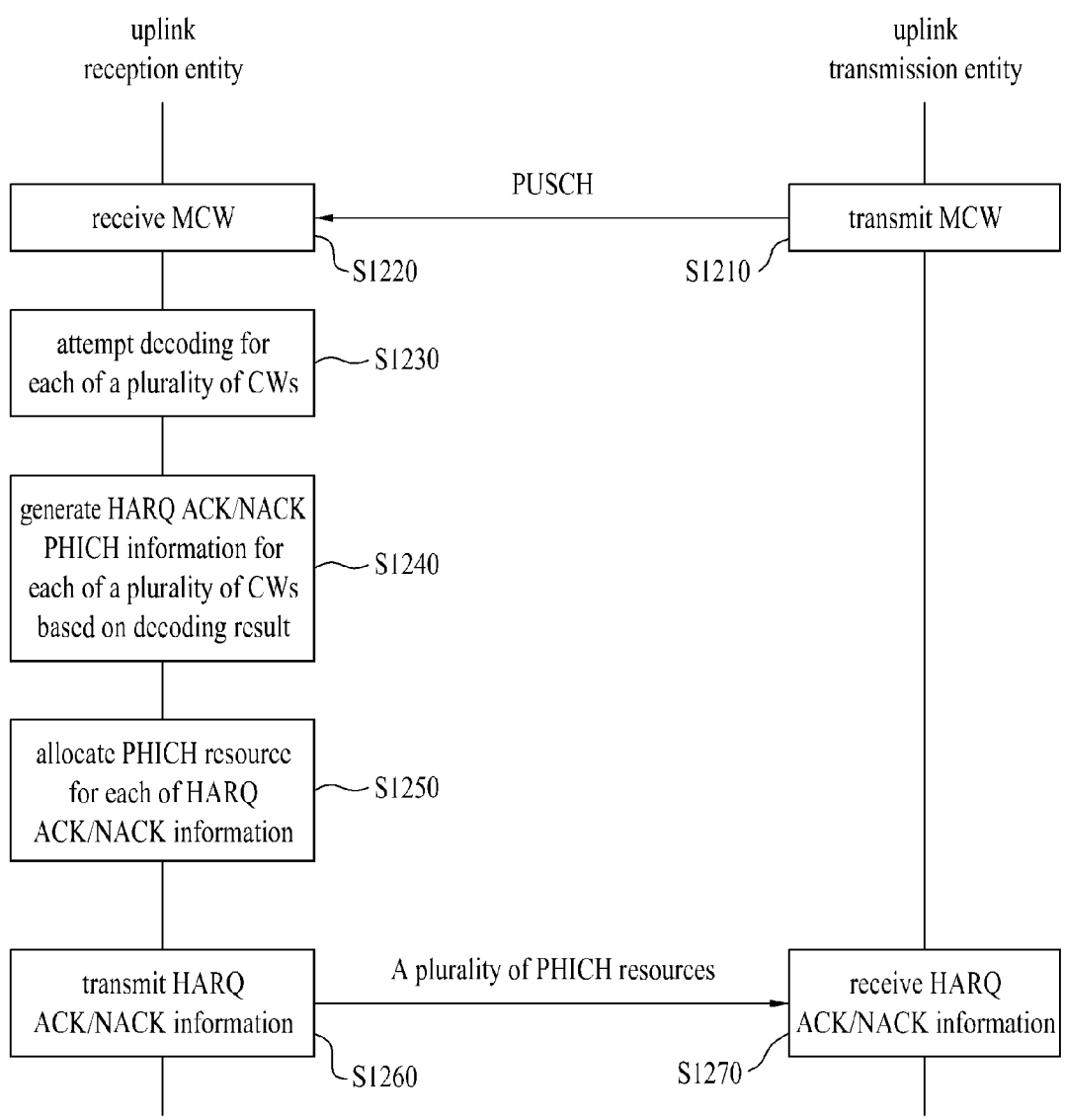
FIG. 12 is a flow chart illustrating a method for transmitting and receiving downlink HARQ ACK/NACK information in accordance with the present invention.

In FIG. 12, step S1210 and step S1270 are performed by the uplink transmission entity (for example, user equipment), and step S1220 to step S1260 are performed by the uplink reception entity (for example, base station).

At step S1210, the uplink transmission entity may generate and transmit uplink data. In this case, the uplink transmission entity may perform multiple codeword (MCW) transmission at one uplink subframe. The uplink data may be transmitted through the PUSCH. At step S1220, the uplink reception entity may receive multiple codewords through the PUSCH.

At step S1230, the uplink reception entity may attempt decoding for each of the received codewords. At step S1240, the uplink reception entity may generate HARQ ACK/NACK information for each of the codewords in accordance with the decoded result. If decoding of the received codewords is successfully performed, HARQ ACK information may be generated. If decoding of the received codewords is failed, HARQ NACK information may be generated. In other words, HARQ ACK or NACK information may be generated for each of the codewords.

At step S1250, the uplink reception entity may allocate PHICH resource for transmitting HARQ ACK generated for each codeword. As described in the aforementioned various embodiments of the present invention, each PHICH resource may be allocated based on the parameter having different values per codeword. Also, this parameter may be set to have different values per carrier. Also, this parameter may be set to have different values per codeword and at the same time to have different values per carrier.

For example, one PHICH resource is identified by a pair of ($n_{PHICH}^{group}(i)$, $n_{PHICH}^{seq}(i)$) (i is a codeword index), and different DMRS cyclic shift indexes and/or the lowest PRB index of different PUSCH allocations may be allocated per codeword and/or carrier, whereby a plurality of PHICH resources for transmission of HARQ ACK information for each codeword may be allocated.

The plurality of PHICH resources may be set in such a manner that the same PHICH group index and different PHICH sequence indexes are set for each codeword and/or carrier, different PHICH group indexes and the same PHICH sequence index are set for each codeword and/or carrier, or different PHICH group indexes and different PHICH sequence indexes are set for each codeword and/or carrier.

In more detail, the PHICH group indexes may be set in such a manner that the lowest PRB index of uplink allocation is set differently per codeword and/or carrier, the cyclic shift index for uplink DMRS is set differently per codeword and/or carrier, or both the PRB index and the DRMS cyclic shift index are set differently per codeword and/or carrier.

Also, the PHICH sequence indexes may be set in such a manner that the lowest PRB index of uplink allocation is set differently per codeword and/or carrier, the cyclic shift index for uplink DMRS is set differently per codeword and/or carrier, or both the PRB index and the DRMS cyclic shift index are set differently per codeword and/or carrier.

The parameter applied to the PHICH group index and the PHICH sequence index for multi-PHICH resource allocation may be defined as one of index value of each of the plurality of codewords, MCS level of each of the plurality of codewords, offset value based on index of each of the plurality of codewords, and offset value based on the number of resource blocks set for uplink transmission. Also, the parameter may be set to different values as much as the spreading factor size used for PHICH modulation between one codeword and another codeword.

At step S1260, the uplink reception entity may transmit HARQ ACK for each codeword through the PHICH resources allocated at the step S1250. At step S1270, the uplink transmission entity may receive downlink HARQ ACK information for multiple codewords transmitted at the step S1210, and may perform retransmission in accordance with the received downlink HARQ ACK information.

Each or two or more of the aforementioned various embodiments of the present invention may be applied to the method for transmitting and receiving downlink HARQ ACK/NACK information and the method for allocating PHICH resources in accordance with the preferred embodiment of the present invention, as described with reference to FIG. 12. In this case, the repeated description will be omitted for clarification.

Also, the same principle suggested in the present invention may be applied to PHICH resource allocation for transmission and reception of downlink HARQ ACK/NACK information in response to MIMO transmission between the base station and the relay node (on a backhaul uplink and a backhaul downlink) and MIMO transmission between the relay node and the user equipment (on an access uplink and an access downlink).

Figure 13:
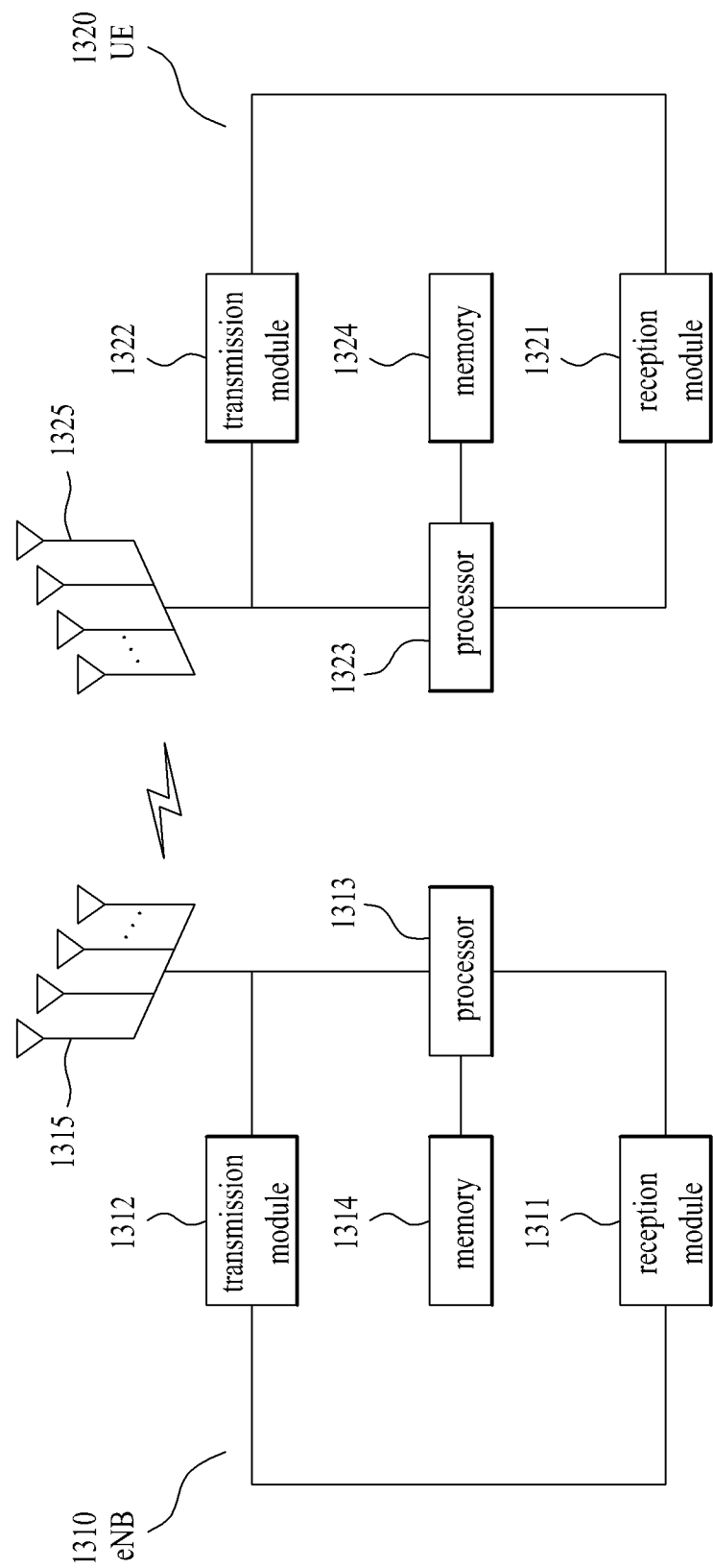
FIG. 13 is a diagram illustrating a configuration of a base station and a user equipment according to the present invention.

FIG. 13 is a diagram illustrating a configuration of a base station and a user equipment according to the present invention.

Referring to FIG. 13, the base station 1310 according to the present invention may include a reception module 1311, a transmission module 1312, a processor 1313, a memory 1314 and a plurality of antennas 1315. The plurality of antennas 1315 mean the base station that supports MIMO transmission and reception. The reception module 1311 may receive various signals, data, and information on the uplink from the user equipment. The transmission module 1312 may transmit various signals, data, and information on the downlink to the user equipment. The processor 1313 may control the overall operation of the base station 1310.

The base station 1310 according to one embodiment of the present invention may be configured to transmit downlink HARQ ACK/NACK information. Also, the base station 1310 may be configured to allocate multiple PHICH resources for downlink HARQ ACK/NACK information transmission. The processor 1313 of the base station may be configured to receive a plurality of codewords from one user equipment on an uplink data channel through the reception module 1311. Also, the processor 1313 may be configured to generate ACK/NACK information for each of the plurality of codewords in accordance with a decoding result of the plurality of codewords. Also, the processor 1313 may be configured to transmit each of the generated ACK/NACK information to the user equipment on the plurality of PHICH resources through the transmission module 1312. In this case, each of the plurality of PHICH resources may be allocated for transmission of ACK/NACK information for each of the plurality of codewords on the basis of the parameter having different values per codeword. For example, one PHICH resource is identified by a pair of the DMRS cyclic shift index and the lowest PRB index of PUSCH allocation, and different DMRS cyclic shift indexes and/or the lowest PRB index of different PUSCH allocations may be allocated per codeword and/or carrier, whereby the plurality of PHICH resources for transmission of HARQ ACK/NACK information for each codeword may be allocated.

The processor 1313 of the base station 1310 may perform operation process of information received by the base station 1310 and information to be transmitted to the outside, and the memory 1314 may store the operation processed information for a predetermined time and may be replaced with a buffer (not shown).

Referring to FIG. 13, the user equipment 1320 according to the present invention may include a reception module 1321, a transmission module 1322, a processor 1323, a memory 1324, and a plurality of antennas 1325. The plurality of antennas 1325 mean the user equipment that supports MIMO transmission and reception. The reception module 1321 may receive various signals, data, and information on the downlink from the base station. The transmission module 1322 may transmit various signals, data, and information on the uplink to the base station. The processor 1323 may control the overall operation of the user equipment 1320.

The user equipment 1320 according to one embodiment of the present invention may be configured to receive downlink HARQ ACK/NACK information. Also, the user equipment 1320 may be configured to receive downlink HARQ ACK/NACK information for each of the plurality of codewords on the multiple PHICH resources. The processor 1323 of the user equipment may be configured to transmit the plurality of codewords to the base station on an uplink data channel through the transmission module 1322. Also, the processor 1323 may be configured to receive each of ACK/NACK information for each of the plurality of codewords, which is generated in accordance with a decoding result of the plurality of codewords, on each of the plurality of PHICH resources from the base station through the reception module 1321. In this case, each of the plurality of PHICH resources may be allocated for transmission of ACK/NACK information for each of the plurality of codewords on the basis of the parameter having different values per codeword. For example, one PHICH resource is identified by a pair of the DMRS cyclic shift index and the lowest PRB index of PUSCH allocation, and different DMRS cyclic shift indexes and/or the lowest PRB index of different PUSCH allocations may be allocated per codeword and/or carrier. The user equipment 1320 may receive the HARQ ACK/NACK information for each codeword through the allocated PHICH resources.

In addition, the processor 1323 of the user equipment 1320 may perform operation process of information received by the user equipment 1320 and information to be transmitted to the outside, and the memory 1324 may store the operation processed information for a predetermined time and may be replaced with a buffer (not shown).

The matters described in the aforementioned various embodiments of the present invention may independently be applied to the detailed configuration of the base station and the user equipment, or two or more embodiments may be applied to the detailed configuration of the base station and the user equipment. The repeated description will be omitted for clarification.

Also, the description of the base station 1310 in the description of FIG. 13 may equally be applied to the relay station as the downlink transmission entity or the uplink reception entity, and the description of the user equipment 1320 may equally be applied to the relay station as the downlink reception entity or the uplink transmission entity.

The aforementioned embodiments according to the present invention may be implemented by various means, for example, hardware, firmware, software, or their combination.

If the embodiment of the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention may be applied to various mobile communication systems.

The invention claimed is:

1. A method for transmitting downlink hybrid automatic repeat request (HARQ) ACK/NACK information in a wireless communication system supporting carrier aggregation, the method comprising the steps of:
   receiving, on an uplink data channel, a plurality of codewords from an uplink transmission entity;
   generating ACK/NACK information for each of the plurality of codewords, in accordance with the results of decoding of the plurality of codewords; and
   transmitting each of the generated ACK/NACK information to the uplink transmission entity on each of a plurality of physical HARQ indicator channel (PHICH) resources,
   wherein each of the plurality of PHICH resources is allocated for transmission of the ACK/NACK information for each of the plurality of codewords, based on a parameter having different values for each of the codewords per carrier, and
   wherein the parameter is defined as a modulation and coding scheme (MCS) level of each of the plurality of codewords or an offset value based on a number of resource blocks set for uplink transmission.

2. The method according to claim 1, wherein the plurality of PHICH resources include a PHICH group index and a PHICH sequence index, and one or more of the PHICH group index and the PHICH sequence index are determined based on the parameter.

3. The method according to claim 2, wherein the PHICH group index includes the lowest physical resource block (PRB) index of uplink allocation and a cyclic shift index for an uplink demodulation reference signal (DMRS), and one or more of the lowest PRB index and the cyclic shift index are determined differently based on the parameter.

4. The method according to claim 2, wherein the PHICH sequence index includes the lowest physical resource block (PRB) index of uplink allocation and a cyclic shift index for an uplink demodulation reference signal (DMRS), and one or more of the lowest PRB index and the cyclic shift index are determined differently based on the parameter.

5. The method according to claim 1, wherein the parameter is set to different values as much as a spreading factor size used for PHICH modulation between one codeword and another codeword.

6. A method for receiving downlink hybrid automatic repeat request (HARQ) ACK/NACK information in a wireless communication system supporting carrier aggregation, the method comprising the steps of:
   transmitting, on an uplink data channel, a plurality of codewords to an uplink reception entity; and
   receiving each of ACK/NACK information for each of the plurality of codewords on each of a plurality of physical HARQ indicator channel (PHICH) resources from the uplink reception entity, the ACK/NACK information being generated in accordance with the results of decoding of the plurality of codewords,
   wherein each of the plurality of PHICH resources is allocated for transmission of the ACK/NACK information for each of the plurality of codewords, based on a parameter having different values for each of the codewords per carrier, and
   wherein the parameter is defined as a modulation and coding scheme (MCS) level of each of the plurality of codewords or an offset value based on a number of resource blocks set for uplink transmission.

7. A base station for transmitting downlink hybrid automatic repeat request (HARQ) ACK/NACK information in a wireless communication system supporting carrier aggregation, the base station comprising:
   a transmission module transmitting a downlink signal to a user equipment;
   a reception module receiving an uplink signal from the user equipment; and
   a processor controlling the base station, which includes the reception module and the transmission module,
   wherein the processor receives, on an uplink data channel, a plurality of codewords from the user equipment, generates ACK/NACK information for each of the plurality of codewords, in accordance with the results of decoding of the plurality of codewords, and transmits each of the generated ACK/NACK information on each of a plurality of physical HARQ indicator channel (PHICH) resources to the user equipment through the transmission module, and each of the plurality of PHICH resources is allocated for transmission of the ACK/NACK information for each of the plurality of codewords, based on a parameter having different values for each of the codewords per carrier, and
   wherein the parameter is defined as a modulation and coding scheme (MCS) level of each of the plurality of codewords or an offset value based on a number of resource blocks set for uplink transmission.

8. A user equipment for receiving downlink hybrid automatic repeat request (HARQ) ACK/NACK information in a wireless communication system supporting carrier aggregation, the user equipment comprising:
   a transmission module transmitting an uplink signal to a base station;
   a reception module receiving a downlink signal from the base station; and
   a processor controlling the user equipment, which includes the reception module and the transmission module,
   wherein the processor transmits, on an uplink data channel, a plurality of codewords to the base station, and receives each of ACK/NACK information for each of the plurality of codewords on each of a plurality of physical HARQ indicator channel (PHICH) resources from the base station through the reception module, the ACK/NACK information being generated in accordance with the results of decoding of the plurality of codewords, and each of the plurality of PHICH resources is allocated for transmission of the ACK/NACK information for each of the plurality of codewords, based on a parameter having different values for each of the codewords per carrier, and wherein the parameter is defined as a modulation and coding scheme (MCS) level of each of the plurality of codewords or an offset value based on a number of resource blocks set for uplink transmission.

* * * * *